(12) United States Patent
Kelly et al.

(10) Patent No.: US 7,716,452 B1
(45) Date of Patent: May 11, 2010

(54) TRANSLATED MEMORY PROTECTION APPARATUS FOR AN ADVANCED MICROPROCESSOR

(76) Inventors: Edmund J. Kelly, 3251 Pinot Blanc Way, San Jose, CA (US) 95135; Robert F. Cmelik, 1024 Chula Vista Ter., Sunnyvale, CA (US) 94086; Malcolm J. Wing, 24 Kent Pl., Apt. 5, Menlo Park, CA (US) 94025

( * ) Notice: Subject to any disclaimer, the term of this patent is extended or adjusted under 35 U.S.C. 154(b) by 557 days.

(21) Appl. No.: 10/438,158

(22) Filed: May 13, 2003

Related U.S. Application Data

(63) Continuation of application No. 09/699,947, filed on Oct. 30, 2000, which is a continuation of application No. 08/702,771, filed on Aug. 22, 1996.

(51) Int. Cl.
*G06F 12/00* (2006.01)
*G06F 13/00* (2006.01)

(52) U.S. Cl. .............. 711/206; 711/100; 711/147; 711/154; 711/200

(58) Field of Classification Search .......... 714/9, 714/53, 723; 711/100, 147, 154, 200, 202, 711/203, 206, 207; 712/23, 204
See application file for complete search history.

(56) References Cited

U.S. PATENT DOCUMENTS

| | | | |
|---|---|---|---|
| 3,863,228 A | 1/1975 | Taylor | 340/172.5 |
| 4,245,302 A | 1/1981 | Amdahl | |
| 4,458,316 A | 7/1984 | Fry et al. | 364/200 |
| 4,467,411 A | 8/1984 | Fry et al. | 364/200 |
| 4,481,573 A | 11/1984 | Fukunaga et al. | 364/200 |
| 4,530,050 A | 7/1985 | Fukunaga et al. | 364/200 |
| 4,590,549 A | 5/1986 | Burrage et al. | 364/131 |
| 4,598,402 A | 7/1986 | Matsumoto et al. | 371/38 |
| 4,607,331 A | 8/1986 | Goodrich, Jr. et al. | 364/200 |
| 4,825,412 A | 4/1989 | Sager et al. | 365/49 |
| 4,875,160 A | 10/1989 | Brown, III | |
| 4,896,257 A | 1/1990 | Ikeda et al. | 364/200 |
| 4,914,577 A | 4/1990 | Stewart et al. | 364/200 |
| 4,928,225 A | 5/1990 | McCarthy et al. | 364/200 |

(Continued)

FOREIGN PATENT DOCUMENTS

EP  0651331 A1  5/1995

(Continued)

OTHER PUBLICATIONS

IBM TDB, May 1994; vol. 37, Issue 5, pp. 249-250.*

(Continued)

*Primary Examiner*—Tuan V. Thai

(57) ABSTRACT

A method of responding to an attempt to write a memory address including a target instruction which has been translated to a host instruction for execution by a host processor including the steps of marking a memory address including a target instruction which has been translated to a host instruction, detecting a memory address which has been marked when an attempt is made to write to the memory address, and responding to the detection of a memory address which has been marked by protecting a target instruction at the memory address until it has been assured that translations associated with the memory address will not be utilized before being updated.

17 Claims, 11 Drawing Sheets

U.S. PATENT DOCUMENTS

| | | | |
|---|---|---|---|
| 4,954,942 A | 9/1990 | Masuda et al. | 364/200 |
| 4,992,934 A | 2/1991 | Portanova et al. | 364/200 |
| 5,097,409 A | 3/1992 | Schwartz et al. | 395/425 |
| 5,138,708 A | 8/1992 | Vosbury | 395/575 |
| 5,142,672 A | 8/1992 | Johnson et al. | 395/500 |
| 5,197,144 A | 3/1993 | Edenfield et al. | 395/425 |
| 5,239,646 A | 8/1993 | Kimura | 395/575 |
| 5,247,628 A | 9/1993 | Grohoski | 395/375 |
| 5,247,648 A | 9/1993 | Watkins et al. | 395/425 |
| 5,274,815 A | 12/1993 | Trissel et al. | 395/700 |
| 5,280,592 A | 1/1994 | Ryba et al. | |
| 5,282,274 A | 1/1994 | Liu | 395/400 |
| 5,317,720 A | 5/1994 | Stamm et al. | 395/425 |
| 5,349,658 A | 9/1994 | O'Rourke et al. | 395/700 |
| 5,361,340 A | 11/1994 | Kelly et al. | 395/400 |
| 5,410,658 A | 4/1995 | Sawase et al. | 395/375 |
| 5,437,017 A | 7/1995 | Moore et al. | 12/8 |
| 5,442,766 A | 8/1995 | Chu et al. | 395/414 |
| 5,455,834 A | 10/1995 | Chang et al. | |
| 5,463,767 A | 10/1995 | Joichi et al. | 395/183.13 |
| 5,465,337 A | 11/1995 | Kong et al. | 395/417 |
| 5,467,473 A | 11/1995 | Kahle et al. | 395/800 |
| 5,481,685 A | 1/1996 | Nguyen et al. | 395/375 |
| 5,481,719 A * | 1/1996 | Ackerman et al. | 718/108 |
| 5,493,660 A | 2/1996 | DeLano et al. | |
| 5,507,030 A | 4/1996 | Sites | 395/800 |
| 5,517,615 A | 5/1996 | Sefidvash et al. | 395/182.03 |
| 5,526,510 A | 6/1996 | Akkary et al. | 395/460 |
| 5,528,755 A | 6/1996 | Beardsley et al. | 395/185.01 |
| 5,537,559 A * | 7/1996 | Kane et al. | 712/244 |
| 5,542,059 A | 7/1996 | Blomgren | |
| 5,546,552 A | 8/1996 | Coon et al. | 395/375 |
| 5,553,255 A | 9/1996 | Jain et al. | 395/375 |
| 5,561,814 A | 10/1996 | Glew et al. | 395/833 |
| 5,564,014 A | 10/1996 | Yamashita et al. | 395/182.15 |
| 5,564,018 A | 10/1996 | Flores et al. | 395/200.02 |
| 5,564,111 A | 10/1996 | Glew et al. | 395/185.06 |
| 5,566,298 A | 10/1996 | Boggs et al. | 395/182.08 |
| 5,568,614 A | 10/1996 | Mendelson et al. | 395/200.08 |
| 5,574,922 A | 11/1996 | James | 395/561 |
| 5,574,927 A | 11/1996 | Scantlin | 395/800 |
| 5,577,231 A | 11/1996 | Scalzi et al. | 395/500 |
| 5,581,722 A | 12/1996 | Welland | 395/417 |
| 5,598,546 A | 1/1997 | Blomgren | 395/385 |
| 5,598,560 A | 1/1997 | Benson | 395/707 |
| 5,604,753 A | 2/1997 | Bauer et al. | 371/40.1 |
| 5,613,083 A | 3/1997 | Glew et al. | 395/417 |
| 5,613,090 A | 3/1997 | Willems | 395/500 |
| 5,615,327 A | 3/1997 | Magee et al. | |
| 5,623,628 A | 4/1997 | Brayton et al. | 395/468 |
| 5,638,525 A | 6/1997 | Hammond et al. | 395/385 |
| 5,644,742 A | 7/1997 | Shen et al. | 395/591 |
| 5,701,493 A * | 12/1997 | Jaggar | 710/261 |
| 5,721,927 A | 2/1998 | Baraz et al. | 395/705 |
| 5,740,391 A | 4/1998 | Hunt | 395/376 |
| 5,768,567 A | 6/1998 | Klein et al. | 395/500 |
| 5,790,825 A * | 8/1998 | Traut | 712/209 |
| 5,792,970 A | 8/1998 | Mizobata | 84/607 |
| 5,805,490 A | 9/1998 | Machida | 364/784.01 |
| 5,832,205 A * | 11/1998 | Kelly et al. | 714/53 |
| 5,838,948 A | 11/1998 | Bunza | 395/500 |
| 5,875,340 A | 2/1999 | Quarnstrom et al. | 395/733 |
| 5,926,832 A * | 7/1999 | Wing et al. | 711/141 |
| 5,930,832 A | 7/1999 | Heaslip et al. | 711/207 |
| 5,958,061 A | 9/1999 | Kelly et al. | 714/1 |
| 5,963,737 A * | 10/1999 | Mealey et al. | 712/244 |
| 6,031,992 A * | 2/2000 | Cmelik et al. | 717/138 |
| 6,038,661 A * | 3/2000 | Yoshioka et al. | 712/244 |
| 6,079,003 A | 6/2000 | Witt et al. | 711/200 |
| 6,199,152 B1 * | 3/2001 | Kelly et al. | 711/207 |
| 6,208,543 B1 | 3/2001 | Tupari et al. | 365/49 |
| 6,266,752 B1 | 7/2001 | Witt et al. | 711/200 |
| 6,415,379 B1 * | 7/2002 | Keppel et al. | 712/209 |
| 6,571,316 B1 * | 5/2003 | D'Souza et al. | 711/129 |
| 6,615,300 B1 * | 9/2003 | Banning et al. | 710/100 |
| 6,880,152 B1 * | 4/2005 | Torvalds et al. | 717/138 |
| 6,907,600 B2 | 6/2005 | Neiger et al. | |
| 2004/0117593 A1 | 6/2004 | Uhlig et al. | |

FOREIGN PATENT DOCUMENTS

| | | |
|---|---|---|
| EP | 742512 A2 | 11/1996 |
| JP | 53063820 | 6/1978 |
| JP | 60054048 | 3/1985 |
| JP | 01100638 | 4/1989 |
| JP | 01255933 | 10/1989 |
| JP | 02213942 | 8/1990 |
| JP | 03030022 | 2/1991 |
| JP | 03255535 | 11/1991 |
| JP | 03269628 | 12/1991 |
| JP | 04246728 | 9/1992 |
| JP | 06266553 | 9/1994 |
| JP | 07505242 | 6/1995 |
| WO | WO96/30829 | 3/1996 |

OTHER PUBLICATIONS

Ebcioglu et al.; "Daisy: Dynamic Compilation for 100% Architectural Compatibility"; IBM Thomas J. Watson Research Center Yorktown Heights, NY; Feb. 6, 1997.

IBM Technical Disclosure Bulletin; "Gathering Store Instructions in a Superscalar Processor"; XP 0006382245; vol. 39, No. 9, Sep. 1996 pp. 103-105.

Halfhill; "Emulation: RISC's Secret Weapon"; Special Report: The RISC Decision; BYTE Apr. 1994.

Andrews et al.; "Migrating a CISC Computer Family Onto RISC Via Object Code Translation"; Tandem Computers, Cupertino, CA 1992 pp. 213-222; Association of Computing Machinery 1992.

Cmelik et al.; "Shade: A Fast Instructionset Simulator for Execution Profiling"; Association for Computing Machinery 1994.

Bedichek; "Talisman Fast and Accurate Multicomputer Simulation"; Lab for Computer Science Cambridge MA; Association of Computing Machinery 1995.

Ando et al.; "Unconstrained Speculative Execution With Predicated State Buffering"; System LSI Laboratory, Japan; pp. 126-213; Association of Computing Machinery 1995.

May; MIMIC: A Fast System/370 Simulator; IBM Thomas J. Watson Research Center NY; Association of Computing Machinery 1987.

Tremblay et al.; "A Fast and Flexible Performance Simulator for Micro-Architecture Trade-off Analysis on Ultrasparc-I"; 32nd Design Automation Conference; San Francisco, CA 1995.

Kumar et al.; "Emulation Verification of the Motorola 68060"; Motorola Inc.; Austin, TX; 1995 IEEE.

Note et al.; Rapid Prototyping of DSP Systems: Requirements and Solutions; Philips ITCL Belgium; 1995 IEEE.

Witchel et al.; "Embra Fast and Flexible Machine Simulation"; Sigmetrics ACM 1996; pp. 68-79.

Bedichek, R. C., Talisman: Fast and Accurate Multicomputer Simulation, MIT 1995.

Silberman G M et al. "An Architectural Framework for Migration From CISC to Higher Performance Platforms' International Conference on Supercomputing, Conference Proceedings", (Jul. 19, 1992) pp. 198-215 XP000576925.

Ebcioglu et al. "Daisy: Dynamic Compilation for 100% Architectural Compability" 24TH. Annual International Symposium on Computer Architecture. Denver, Jun. 2-4 1997, Annual International Symposium on Computer Architecture, New York, ACM, US, vol. Conf. 24, Jun. 2, 1997 pp. 26-37, XP000738145 ISBN 0-7803-4175-9.

"Parallel Processing Mechansim" compiled by Yoshizo Takahashi, First edition published on Aug. 25, 1989 by Maruzen (pp. 186-199).

* cited by examiner

TRANSLATED MEMORY PROTECTION APPARATUS FOR AN ADVANCED MICROPROCESSOR

RELATED APPLICATIONS

This patent application is a Continuation of co-pending, commonly-owned patent application Ser. No. 09/699,947, filed on Oct. 30, 2000, entitled "TRANSLATED MEMORY PROTECTION APPARATUS FOR AN ADVANCED MICROPROCESSOR," by Kelly et al., which was a Continuation of co-pending, commonly-owned patent application Ser. No. 08/702,771, filed on Aug. 22, 1996, entitled "TRANSLATED MEMORY PROTECTION APPARATUS FOR AN ADVANCED MICROPROCESSOR," by Kelly et al., both of which are incorporated herein by reference.

BACKGROUND OF THE INVENTION

1. Field of the Invention

This invention relates to computer systems and, more particularly, to methods and apparatus for preventing the misuse of instructions which have been translated from instructions of a first instruction set into another instruction set when instructions of the first instruction set are to be overwritten in memory.

2. History of the Prior Art

There are thousands of application programs which run on computers designed around particular families of microprocessors. The largest number of programs in existence are designed to run on computers (generally referred to as "IBM Compatible Personal Computers") using the "X86" family of microprocessors (including the Intel® 8088, Intel 8086, Intel 80186, Intel 80286, i386, i486, and progressing through the various Pentium® microprocessors) designed and manufactured by Intel Corporation of Santa Clara, Calif. There are many other examples of programs designed to run on computers using other families of processors. Because there are so many application programs which run on these computers, there is a large market for microprocessors capable of use in such computers, especially computers designed to process X86 programs. The microprocessor market is not only large but also quite lucrative.

Although the market for microprocessors which are able to run large numbers of application programs is large and lucrative, it is quite difficult to design a new competitive microprocessor. For example, even though the X86 family of processors has been in existence for a number of years and these processors are included in the majority of computers sold and used, there are few successful competitive microprocessors which are able to run X86 programs. The reasons for this are many.

In order to be successful, a microprocessor must be able to run all of the programs (including operating systems and legacy programs) designed for that family of processors as fast as existing processors without costing more than existing processors. In addition, to be economically successful, a new microprocessor must do at least one of these things better than existing processors to give buyers a reason to choose the new processor over existing proven processors.

It is difficult and expensive to make a microprocessor run as fast as state of the art microprocessors. Processors carry out instructions through primitive operations such as loading, shifting, adding, storing, and similar low level operations and respond only to such primitive instructions in executing any instruction furnished by an application program. For example, a processor designed to run the instructions of a complicated instruction set computer (CISC) such as a X86 in which instructions may designate the process to be carried out at a relatively high level have historically included read only memory (ROM) which stores so-called micro-instructions. Each micro-instruction includes a sequence of primitive instructions which when run in succession bring about the result commanded by the high level CISC instruction.

Typically, an "add A to B" CISC instruction is decoded to cause a look up of an address in ROM at which a micro-instruction for carrying out the functions of the "add A to B" instruction is stored. The micro-instruction is loaded, and its primitive instructions are run in sequence to cause the "add A to B" instruction to be carried out. With such a CISC computer, the primitive operations within a micro-instruction can never be changed during programming execution. Each CISC instruction can only be run by decoding the instruction, addressing and fetching the micro-instruction, and running the sequence of primitive operations in the order provided in the micro-instruction. Each time the micro-instruction is run, the same sequence must be followed.

State of the art processors for running X86 applications utilize a number of techniques to provide the fastest processing possible at a price which is still economically reasonable. Any new processor which implements known hardware techniques for accelerating the speed at which a processor may run must increase the sophistication of the processing hardware. This requires increasing the cost of the hardware.

For example, a superscalar microprocessor which uses a plurality of processing channels in order to execute two or more operations at once has a number of additional requirements. At the most basic level, a simple superscalar microprocessor might decode each application instruction into the micro-instructions which carry out the function of the application instruction. Then, the simple superscalar microprocessor schedules two micro-instructions to run together if the two micro-instructions do not require the same hardware resources and the execution of a micro-instruction does not depend on the results of other micro-instructions being processed.

A more advanced superscalar microprocessor typically decodes each application instruction into a series of primitive instructions so that those primitive instructions may be reordered and scheduled into the most efficient execution order. This requires that each individual primitive operation be addressed and fetched. To accomplish reordering, the processor must be able to ensure that a primitive instruction which requires data resulting from another primitive instruction is run after that other primitive instruction produces the needed data. Such a superscalar microprocessor must assure that two primitive instructions being run together do not both require the same hardware resources. Such a processor must also resolve conditional branches before the effects of branch operations can be completed.

Thus, superscalar microprocessors require extensive hardware to compare the relationships of the primitive instructions to one another and to reorder and schedule the sequence of the primitive instructions to carry out any instruction. As the number of processing channels increases, the amount and cost of the hardware to accomplish these superscalar acceleration techniques increases approximately quadratically. All of these hardware requirements increase the complexity and cost of the circuitry involved. As in dealing with micro-instructions, each time an application instruction is executed, a superscalar microprocessor must use its relatively complicated addressing and fetching hardware to fetch each of these primitive instructions, must reorder and reschedule these primitive instructions based on the other primitive instructions and hardware usage, and then must execute all of the rescheduled primitive instructions. The need to run each application instruction through the entire hardware sequence each time it is executed limits the speed at which a superscalar processor is capable of executing its instructions.

Moreover, even though these various hardware techniques increase the speed of processing, the complexity involved in providing such hardware significantly increases the cost of such a microprocessor. For example, the Intel i486 DX4 processor uses approximately 1.5 million transistors. Adding the hardware required to accomplish the checking of dependencies and scheduling necessary to process instructions through two channels in a basic superscalar microprocessor such as the Intel Pentium® requires the use of more than three million transistors. Adding the hardware to allow reordering among primitive instructions derived from different target instructions, provide speculative execution, allow register renaming, and provide branch prediction increases the number of transistors to over six million in the Intel Pentium Pro™ microprocessor. Thus, it can be seen that each hardware addition to increase operation speed has drastically increased the number of transistors in the latest state of the art microprocessors.

Even using these known techniques may not produce a microprocessor faster than existing microprocessors because manufacturers use most of the economically feasible techniques known to accelerate the operation of existing microprocessors. Consequently, designing a faster processor is a very difficult and expensive task.

Reducing the cost of a processor is also very difficult. As illustrated above, hardware acceleration techniques which produce a sufficiently capable processor are very expensive. One designing a new processor must obtain the facilities to produce the hardware. Such facilities are very difficult to obtain because chip manufacturers do not typically spend assets on small runs of devices. The capital investment required to produce a chip manufacturing facility is so great that it is beyond the reach of most companies.

Even though one is able to design a new processor which runs all of the application programs designed for a family of processors at least as fast as competitive processors, the price of competitive processors includes sufficient profit that substantial price reductions are sure to be faced by any competitor.

Although designing a competitive processor by increasing the complexity of the hardware is very difficult, another way to run application programs (target application programs) designed for a particular family of microprocessors (target microprocessors) has been to emulate the target microprocessor in software on another faster microprocessor (host microprocessor). This is an incrementally inexpensive method of running these programs because it requires only the addition of some form of emulation software which enables the application program to run on a faster microprocessor. The emulator software changes the target instructions of an application program written for the target processor family into host instructions capable of execution by the host microprocessor. These changed instructions are then run under control of the operating system on the faster host microprocessor.

There have been a number of different designs by which target applications may be run on host computers with faster processors than the processors of target computers. In general, the host computers executing target programs using emulation software utilize reduced instruction set (RISC) microprocessors because RISC processors are theoretically simpler and consequently can run faster than other types of processors.

However, even though RISC computer systems running emulator software are often capable of running X86 (or other) programs, they usually do so at a rate which is substantially slower than the rate at which state of the art X86 computer systems run the same programs. Moreover, often these emulator programs are not able to run all or a large number of the target programs available.

The reasons why emulator programs are not able to run target programs as rapidly as the target microprocessors is quite complicated and requires some understanding of the different emulation operations. FIG. 1 includes a series of diagrams representing the different ways in which a plurality of different types of microprocessors execute target application programs.

In FIG. 1(a), a typical CISC microprocessor such as an Intel X86 microprocessor is shown running a target application program which is designed to be run on that target processor. As may be seen, the application is run on the CISC processor using a CISC operating system (such as MS DOS, Windows 3.1, Windows NT, and OS/2 which are used with X86 computers) designed to provide interfaces by which access to the hardware of the computer may be gained. Typically, the instructions of the application program are selected to utilize the devices of the computer only through the access provided by the operating system. Thus, the operating system handles the manipulations which allow applications access to memory and to the various input/output devices of the computer. The target computer includes memory and hardware which the operating system recognizes, and a call to the operating system from a target application causes an operating system device driver to cause an expected operation to occur with a defined device of the target computer. The instructions of the application execute on the processor where they are changed into operations (embodied in microcode or the more primitive operations from which microcode is assembled) which the processor is capable of executing. As has been described above, each time a complicated target instruction is executed, the instruction calls the same subroutine stored as microcode (or as the same set of primitive operations). The same subroutine is always executed. If the processor is a superscalar, these primitive operations for carrying out a target instruction can often be reordered by the processor rescheduled, and executed using the various processing channels in the manner described above; however, the subroutine is still fetched and executed.

In FIG. 1(b), a typical RISC microprocessor such as a PowerPC microprocessor used in an Apple Macintosh computer is represented running the same target application program which is designed to be run on the CISC processor of FIG. 1(a). As may be seen, the target application is run on the host processor using at least a partial target operating system to respond to a portion of the calls which the target application generates. Typically these are calls to the application-like portions of the target operating system used to provide graphical interfaces on the display and short utility programs which are generally application-like. The target application and these portions of the target operating system are changed by a software emulator such as Soft PC® which breaks the instructions furnished by the target application program and the application-like target operating system programs into instructions which the host processor and its host operating system are capable of executing. The host operating system provides the interfaces through which access to the memory and input/output hardware of the RISC computer may be gained.

However, the host RISC processor and the hardware devices associated with it in a host RISC computer are usually quite different than are the devices associated with the processor for which the target application was designed; and the various instructions provided by the target application program are designed to cooperate with the device drivers of the target operating system in accessing the various portions of the target computer. Consequently, the emulation program, which changes the instructions of the target application program to primitive host instructions which the host operating system is capable of utilizing, must somehow link the operations designed to operate hardware devices in the target computer to operations which hardware devices of the host system are capable of implementing. Often this requires the emulator software to create virtual devices which respond to the instructions of the target application to carry out operations which the host system is incapable of carrying out because the target devices are not those of the host computer. Sometimes the emulator is required to create links from these virtual devices through the host operating system to host hardware devices which are present but are addressed in a different manner by the host operating system.

Target programs when executed in this manner run relatively slowly for a number of reasons. First, each target instruction from a target application program and from the target operating system must be changed by the emulator into the host primitive functions used by the host processor. If the target application is designed for a CISC machine such as an X86, the target instructions are of varying lengths and quite complicated so that changing them to host primitive instructions is quite involved. The original target instructions are first decoded, and the sequence of primitive host instructions which make up the target instructions are determined. Then the address (or addresses) of each sequence of primitive host instructions is determined, each sequence of the primitive host instructions is fetched, and these primitive host instructions are executed in or out of order. The large number of extra steps required by an emulator to change the target application and operating system instructions into host instructions understood by the host processor must be conducted each time an instruction is executed and slows the process of emulation.

Second, many target instructions include references to operations conducted by particular hardware devices which function in a particular manner in the target computer, hardware which is not available in the host computer. To carry out the operation, the emulation software must either make software connections to the hardware devices of the host computer through the existing host operating system or the emulator software must furnish a virtual hardware device. Emulating the hardware of another computer in software is very difficult. The emulation software must generate virtual devices for each of the target application calls to the host operating system; and each of these virtual devices must provide calls to the actual host devices. Emulating a hardware device requires that when a target instruction is to use the device, the code representing the virtual device required by that instruction be fetched from memory and run to implement the device. Either of these methods of solving the problem adds another series of operations to the execution of the sequence of instructions.

Complicating the problem of emulation is the requirement that the target application take various exceptions which are carried out by hardware of the target computer and the target operating system in order for the computer system to operate. When a target exception is taken during the operation of a target computer, state of the computer at the time of the exception must be saved typically by calling a microcode sequence to accomplish the operation, the correct exception handler must be retrieved, the exception must be handled, then the correct point in the program must be found for continuing with the program. Sometimes this requires that the program revert to the state of the target computer at the point the exception was taken, and at other times a branch provided by the exception handler is taken. In any case, the hardware and software of the target computer required to accomplish these operations must somehow be provided in the process of emulation.

Because the correct target state must be available at the time of any such exception for proper execution, the emulator is forced to keep accurate track of this state at all times so that it is able to correctly respond to these exceptions. In the prior art, this has required executing each instruction in the order provided by the target application because only in this way could correct target state be maintained.

Moreover, prior art emulators have always been required to maintain the order of execution of the target application for other reasons. Target instructions can be of two types, ones which affect memory or ones which affect a memory mapped input/output (I/O) device. There is no way to know without attempting to execute an instruction whether an operation is to affect memory or a memory-mapped I/O device. When instructions operate on memory, optimizing and reordering is possible and greatly aids in speeding the operation of a system. However, operations affecting I/O devices often must be practiced in the precise order in which those operations are programmed without the elimination of any steps or they may have some adverse effect on the operation of the I/O device. For example, a particular I/O operation may have the effect of clearing an I/O register. If the operations take place out of order so that a register is cleared of a value which is still necessary, then the result of the operation may be different than the operation commanded by the target instruction. Without a means to distinguish memory from memory mapped I/O, it is necessary to treat all instructions as though they affect memory mapped I/O. This severely restricts the nature of optimizations that are achievable. Because prior art emulators lack both means to detect the nature of the memory being addressed and means to recover from such failures, they are required to proceed sequentially through the target instructions as though each operation affects memory mapped I/O. This greatly limits the possibility of optimizing the host instructions.

Another problem which limits the ability of prior art emulators to optimize the host code is caused by self-modifying code. If a target instruction has been changed to a sequence of host instructions which in turn write back to change the original target instruction, then the host instructions are no longer valid. Consequently, the emulator must constantly check to determine whether a store is to the target c-ode area. All of these problems make this type of emulation much slower than running a target application on a target processor.

Another example of the type of emulation software shown in FIG. 1(b) is described in an article entitled, "Talisman. Fast and Accurate Multicomputer Simulation," R. C. Bedichek, Laboratory for Computer Sciences, Massachusetts Institute of Technology. This is a more complete example of translation in that it can emulate a complete research system and run the research target operating system. Talisman uses a host UNIX operating system.

In FIG. 1(c), another example of emulation is shown. In this case, a PowerPC microprocessor used in an Apple Macintosh computer is represented running a target application program which was designed to be run on the Motorola 68000 family CISC processors used in the original Macintosh computers; this type of arrangement has been required in order to allow Apple legacy programs to run on the Macintosh computers with RISC processors. As may be seen, the target application is run on the host processor using at least a partial target operating system to respond to the application-like portions of the target operating system. A software emulator breaks the instructions furnished by the target application program and the application-like target operating system programs into instructions which the host processor and its host operating system are capable of executing. The host operating system provides the interfaces through which access to the memory and input/output hardware of the host computer may be gained.

Again, the host RISC processor and the devices associated with it in the host RISC computer are quite different than are the devices associated with the Motorola CISC processor; and the various target instructions are designed to cooperate with the target CISC operating system in accessing the various portions of the target computer. Consequently, the emulation program must link the operations designed to operate hardware devices in the target computer to operations which hardware devices of the host system are capable of implementing. This requires the emulator to create software virtual devices which respond to the instructions of the target application and to create links from these virtual devices through the host operating system to host hardware devices which are present but are addressed in a different manner by the host operating system.

The target software run in this manner runs relatively slowly for the same reasons that the emulation of FIG. 1(b) runs slowly. First, each target instruction from the target application and from the target operating system must be changed by fetching the instruction; and all of the host primitive functions derived from that instruction must be run in sequence each time the instruction is executed. Second, the emulation software must generate virtual devices for each of the target application calls to the host operating system; and each of these virtual devices must provide calls to the actual host devices. Third, the emulator must treat all instructions as conservatively as it treats instructions which are directed to memory mapped I/O devices or risk generating exceptions from which it cannot recover. Finally, the emulator must maintain the correct target state at all times and store operations must always check ahead to determine whether a store is to the target code area. All of these requirements eliminate the ability of the emulator to practice significant optimization of the code run on the host processor and make this type of emulation much slower than running the target application on a target processor. Emulation rates less than one-quarter as fast as state of the art processors are considered very good. In general, this has relegated this type of emulation software to uses where the capability of running applications designed for another processor is useful but not primary.

In FIG. 1(d), a particular method of emulating a target application program on a host processor which provides relatively good performance for a very limited series of target applications is illustrated. The target application furnishes instructions to an emulator which changes those instructions into instructions for the host processor and the host operating system. The host processor is a Digital Equipment Corporation Alpha RISC processor, and the host operating system is Microsoft NT. The only target applications which may be run by this system are 32 bit applications designed to be executed by a target X86 processor with a Windows WIN32s compliant operating system. Since the host and target operating systems are almost identical, being designed to handle these same instructions, the emulator software may change the instructions very easily. Moreover, the host operating system is already designed to respond to the same calls that the target application generates so that the generation of virtual devices is considerably reduced.

Although this is technically an emulation system running a target application on a host processor, it is a very special case. Here the emulation software is running on a host operating system already designed to run similar applications. This allows the calls from the target applications to be more simply directed to the correct facilities of the host and the host operating system. More importantly, this system will run only 32 bit Windows applications which probably amount to less than one percent of all X86 applications. Moreover, this system will run applications on only one operating system, Windows NT; while X86 processors run applications designed for a large number of operating systems. Such a system, therefore, could be considered not to be compatible within the terms expressed earlier in this specification. Thus, a processor running such an emulator cannot be considered to be a competitive X86 processor.

Another method of emulation by which software may be used to run portions of applications written for a first instruction set on a computer which recognizes a different instruction set is illustrated in FIG. 1(e). This form of emulation software is typically utilized by a programmer who may be porting an application from one computer system to another. Typically, the target application is being designed for some target computer other than the host machine on which the emulator is being run. The emulator software analyzes the target instructions, translates those instructions into instructions which may be run on the host machine, and caches those host instructions so that they may be reused. This dynamic translation and caching allows portions of applications to be run very rapidly. This form of emulator is normally used with software tracing tools to provide detailed information about the behavior of a target program being run. The output of a tracing tool may, in turn, be used to drive an analyzer program which analyzes the trace information.

In order to determine how the code actually functions, an emulator of this type, among other things, runs with the host operating system on the host machine, furnishes the virtual hardware which the host operating system does not provide, and otherwise maps the operations of the computer for which the application was designed to the hardware resources of the host machine in order to carry out the operations of the program being run. This software virtualizing of hardware and mapping to the host computer can be very slow and incomplete.

Moreover, because it often requires a plurality of host instructions to carry out one of the target instructions, exceptions including faults and traps which require a target operating system exception handler may be generated and cause the host to cease processing the host instructions at a point unrelated to target instruction boundaries. When this happens, it may be impossible to handle the exception correctly because the state of the host processor and memory is incorrect. If this is the case, the emulator must be stopped and rerun to trace the operations which generated the exception. Thus, even though such an emulator may run sequences of target code very rapidly, it has no method for recovering from these exceptions so cannot run any significant portion of an application rapidly.

This is not a particular problem with this form of emulator because the functions being performed by the emulators, tracers, and the associated analyzers are directed to generating new programs or porting old programs to another machine so that the speed at which the emulator software runs is rarely at issue. That is, a programmer is usually not interested in how fast the code produced by a emulator runs on the host machine but in whether the emulator produces code which is executable on the machine for which it is designed and which will run rapidly on that machine. Consequently, this type of emulation software does not provide a method for running application programs written in a first instruction set to run on a different type of microprocessor for other than programming purposes. An example of this type of emulation software is described in an article entitled, "Shade: A Fast Instruction-Set Simulator for Execution Profiling," Cmelik and Keppel.

It is desirable to provide competitive microprocessors which are faster and less expensive than state of the art microprocessors yet are entirely compatible with target application programs designed for state of the art microprocessors running any operating systems available for those microprocessors.

More particularly, it is desirable to provide a host processor having circuitry for enhancing the speed of operation and compatibility of such a processor.

SUMMARY OF THE INVENTION

It is, therefore, an object of the present invention to provide a host processor with apparatus for enhancing the operation of a microprocessor which is less expensive than conventional state of the art microprocessors yet is compatible with and capable of running application programs and operating systems designed for other microprocessors at a faster rate than those other microprocessors.

This and other objects of the present invention are realized by apparatus for and a method of responding to an attempt to write a memory address including a target instruction which has been translated to a host instruction for execution by a host processor including the steps of marking a memory address including a target instruction which has been translated to a host instruction, detecting a memory address which has been marked when an attempt is made to write to the memory address, and responding to the detection of a memory address which has been marked by protecting a target instruction at the memory address until it has been assured that translations associated with the memory address will not be utilized before being updated.

These and other objects and features of the invention will be better understood by reference to the detailed description which follows taken together with the drawings in which like elements are referred to by like designations throughout the several views.

NOTATION AND NOMENCLATURE

Figure 1:
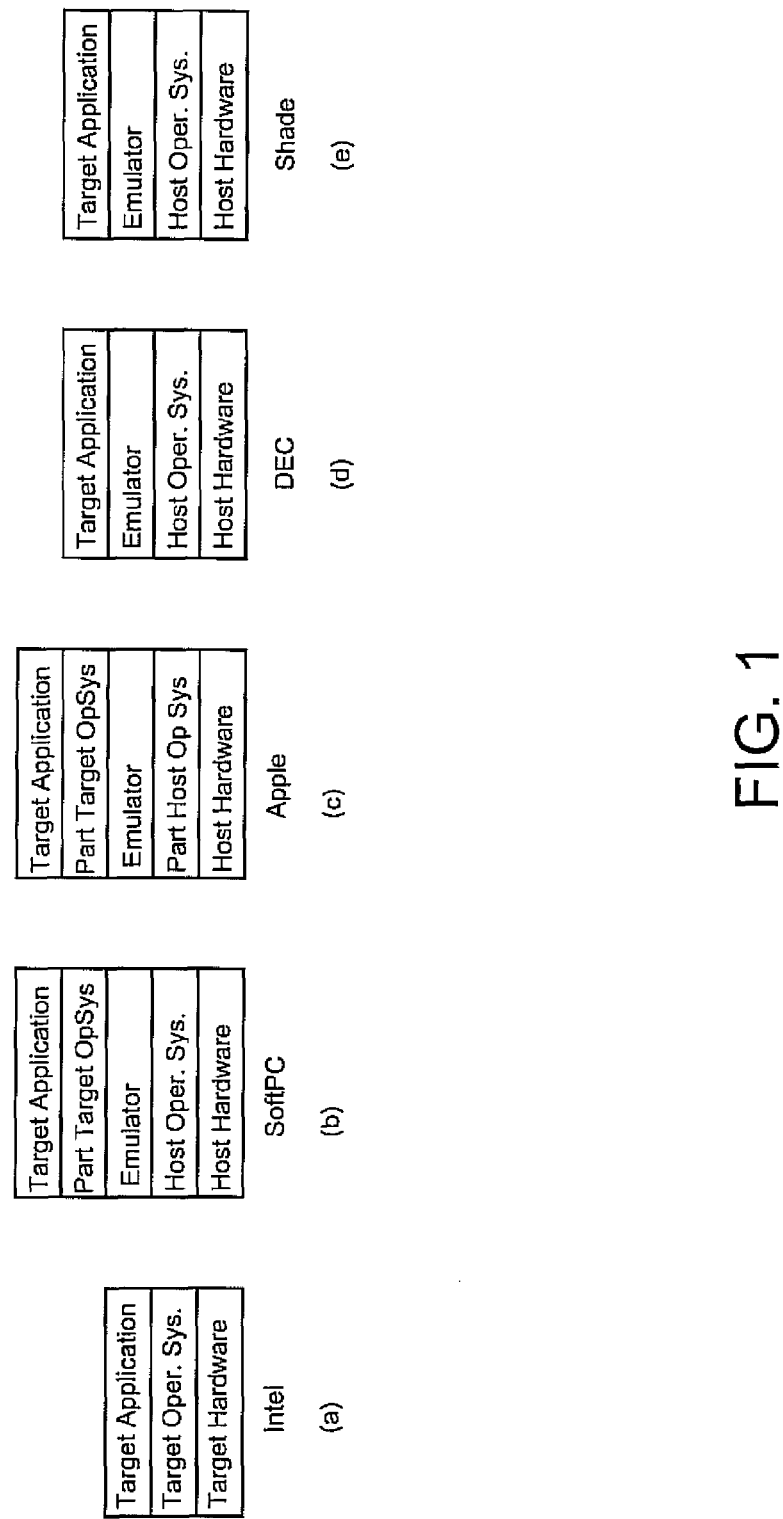
FIGS. 1(a)–(e) are diagrams illustrating the manner of operation of microprocessors designed in accordance with the prior art.

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

During the following description, in some cases the target program is referred to as a program which is designed to be executed on an X86 microprocessor in order to provide exemplary details of operation because the majority of emulators run X86 applications. However, the target program may be one designed to run on any family of target computers. This includes target virtual computers, such as Pcode machines, Postscript machines, or Java virtual machines.

DETAILED DESCRIPTION

The present invention helps overcome the problems of the prior art and provide a microprocessor which is faster than microprocessors of the prior art, is capable of running all of the software for all of the operating systems which may be run by a large number of families of prior art microprocessors, yet is less expensive than prior art microprocessors.

Rather than using a microprocessor with more complicated hardware to accelerate its operation, the present invention is a part of a combination including an enhanced hardware processing portion (referred to as a "morph host" in this specification) which is much simpler than state of the art microprocessors and an emulating software portion (referred to as "code morphing software" in this specification) in a manner that the two portions function together as a microprocessor with more capabilities than any known competitive microprocessor. More particularly, a morph host is a processor which includes hardware enhancements to assist in having state of a target computer immediately at hand when an exception or error occurs, while code morphing software is software which translates the instructions of a target program to morph host instructions for the morph host and responds to exceptions and errors by replacing working state with correct target state when necessary so that correct retranslations occur. Code morphing software may also include various processes for enhancing the speed of processing. Rather than providing hardware to enhance the speed of processing as do all of the very fast prior art microprocessors, the improved microprocessor allows a large number of acceleration enhancement techniques to be carried out in selectable stages by the code morphing software. Providing the speed enhancement techniques in the code morphing software allows the morph host to be implemented using much less complicated hardware which is faster and substantially less expensive than the hardware of prior art microprocessors. As a comparison, one embodiment including the present invention designed to run all available X86 applications is implemented by a morph host including approximately one-quarter of the number of gates of the Pentium Pro microprocessor yet runs X86 applications substantially faster than does the Pentium Pro microprocessor or any other known microprocessor capable of processing these applications.

The code morphing software utilizes certain techniques which have previously been used only by programmers designing new software or emulating new hardware. The morph host includes hardware enhancements especially adapted to allow the acceleration techniques provided by the code morphing software to be utilized efficiently. These hardware enhancements allow the code morphing software to implement acceleration techniques over a broader range of instructions. These hardware enhancements also permit additional acceleration techniques to be practiced by the code morphing software which are unavailable in hardware processors and could not be implemented in those processors except at exorbitant cost. These techniques significantly increase the speed of the microprocessor which includes the present invention compared to the speeds of prior art microprocessors practicing the execution of native instruction sets.

For example, the code morphing software combined with the enhanced morph host allows the use of techniques which allow the reordering and rescheduling of primitive instructions generated by a sequence of target instructions without requiring the addition of significant circuitry. By allowing the reordering and rescheduling of a number of target instructions together, other optimization techniques can be used to reduce the number of processor steps which are necessary to carry out a group of target instructions to fewer than those required by any other microprocessors which will run the target applications.

The code morphing software combined with the enhanced morph host translates target instructions into instructions for the morph host on the fly and caches those host instructions in a memory data structure (referred to in this specification as a "translation buffer"). The use of a translation buffer to hold translated instructions allows instructions to be recalled without rerunning the lengthy process of determining which primitive instructions are required to implement each target instruction, addressing each primitive instruction, fetching each primitive instruction, optimizing the sequence of primitive instructions, allocating assets to each primitive instruction, reordering the primitive instructions, and executing each step of each sequence of primitive instructions involved each time each target instruction is executed. Once a target instruction has been translated, it may be recalled from the translation buffer and executed without the need for any of these myriad of steps.

A primary problem of prior art emulation techniques has been the inability of these techniques to handle with good performance exceptions generated during the execution of a target program. This is especially true of exceptions generated in running the target application which are directed to the target operating system where the correct target state must be available at the time of any such exception for proper execution of the exception and the instructions which follow. Consequently, the emulator is forced to keep accurate track of the target state at all times and must constantly check to determine whether a store is to the target code area. Other exceptions create similar problems. For example, exceptions can be generated by the emulator to detect particular target operations which have been replaced by some particular host function. In particular, various hardware operations of a target processor may be replaced by software operations provided by the emulator software. Additionally, the host processor executing the host instructions derived from the target instructions can also generate exceptions. All of these exceptions can occur either during the attempt to change target instructions into host instructions by the emulator, or when the host translations are executed on the host processor. An efficient emulation must provide some manner of recovering from these exceptions efficiently and in a manner that the exception may be correctly handled. None of the prior art does this for all software which might be emulated.

In order to overcome these limitations of the prior art, a number of hardware improvements are included in the enhanced morph host. These improvements include a gated store buffer and a large plurality of additional processor registers. Some of the additional registers allow the use of register renaming to lessen the problem of instructions needing the same hardware resources. The additional registers also allow the maintenance of a set of host or working registers for processing the host instructions and a set of target registers to hold the official state of the target processor for which the target application was created. The target (or shadow) registers are connected to their working register equivalents through a dedicated interface that allows an operation called "commit" to quickly transfer the content of all working registers to official target registers and allows an operation called "rollback" to quickly transfer the content of all official target registers back to their working register equivalents. The gated store buffer stores working memory state changes on an "uncommitted" side of a hardware "gate" and official memory state changes on a "committed" side of the hardware gate where these committed stores "drain" to main memory. A commit operation transfers stores from the uncommitted side of the gate to the committed side of the gate. The additional official registers and the gated store buffer allow the state of memory and the state of the target registers to be updated together once one or a group of target instructions have been translated and run without error.

These updates are chosen by the code morphing software to occur on integral target instruction boundaries. Thus, if the primitive host instructions making up a translation of a series of target instructions are run by the host processor without generating exceptions, then the working memory stores and working register state generated by those instructions are transferred to official memory and to the official target registers. In this manner, if an exception occurs when processing the host instructions at a point which is not on the boundary of one or a set of target instructions being translated, the original state in the target registers at the last update (or commit) may be recalled to the working registers and uncommitted memory stores in the gated store buffer may be dumped. Then, for the case where the exception generated is a target exception, the target instructions causing the target exception may be retranslated one at a time and executed in serial sequence as they would be executed by a target microprocessor. As each target instruction is correctly executed without error, the state of the target registers may be updated; and the data in the store buffer gated to memory. Then, when the exception occurs again in running the host instructions, the correct state of the target computer is held by the target registers of the morph host and memory; and the operation may be correctly handled without delay. Each new translation generated by this corrective translating may be cached for future use as it is translated or alternatively dumped for a one time or rare occurrence such as a page fault. This allows the microprocessor created by the combination of the code morphing software and the morph host to execute the instructions more rapidly than processors for which the software was originally written.

It should be noted that in executing target programs using the microprocessor including the present invention, many different types of exceptions can occur which are handled in different manners. For example, some exceptions are caused by the target software generating an exception which utilizes a target operating system exception handler. The use of such an exception handler requires that the code morphing software include routines for emulating the entire exception handling process including any hardware provided by the target computer for handling the process. This requires that the code morphing software provide for saving the state of the target processor so that it may proceed correctly after the exception has been handled. Some exceptions like a page fault, which requires fetching data in a new page of memory before the process being translated may be implemented, require a return to the beginning of the process being translated after the exception has been handled. Other exceptions implement a particular operation in software where that operation is not provided by the hardware. These require that the exception handler return the operation to the next step in the translation after the exception has been handled. Each of these different types of exceptions may be efficiently handled by microprocessor including the present invention.

Additionally, some exceptions are generated by host hardware and detect a variety of host and target conditions. Some exceptions behave like exceptions on a conventional microprocessor, but others are used by the code morphing software to detect failure of various speculations. In these cases, the code morphing software, using the state saving and restoring mechanisms described above, causes the target state to be restored to its most recent official version and generates and saves a new translation (or re-uses a previously generated safe translation) which avoids the failed speculation. This translation is then executed.

The morph host includes additional hardware exception detection mechanisms that in conjunction with the rollback and retranslate method described above allow further optimization. Examples are a means to distinguish memory from memory mapped I/O and a means to eliminate memory references by protecting addresses or address ranges thus allowing target variables to be kept in registers.

For the case where exceptions are used to detect failure of other speculations, such as whether an operation affects memory or memory mapped I/O, recovery is accomplished by the generation of new translations with different memory operations and different optimizations.

Figure 2:
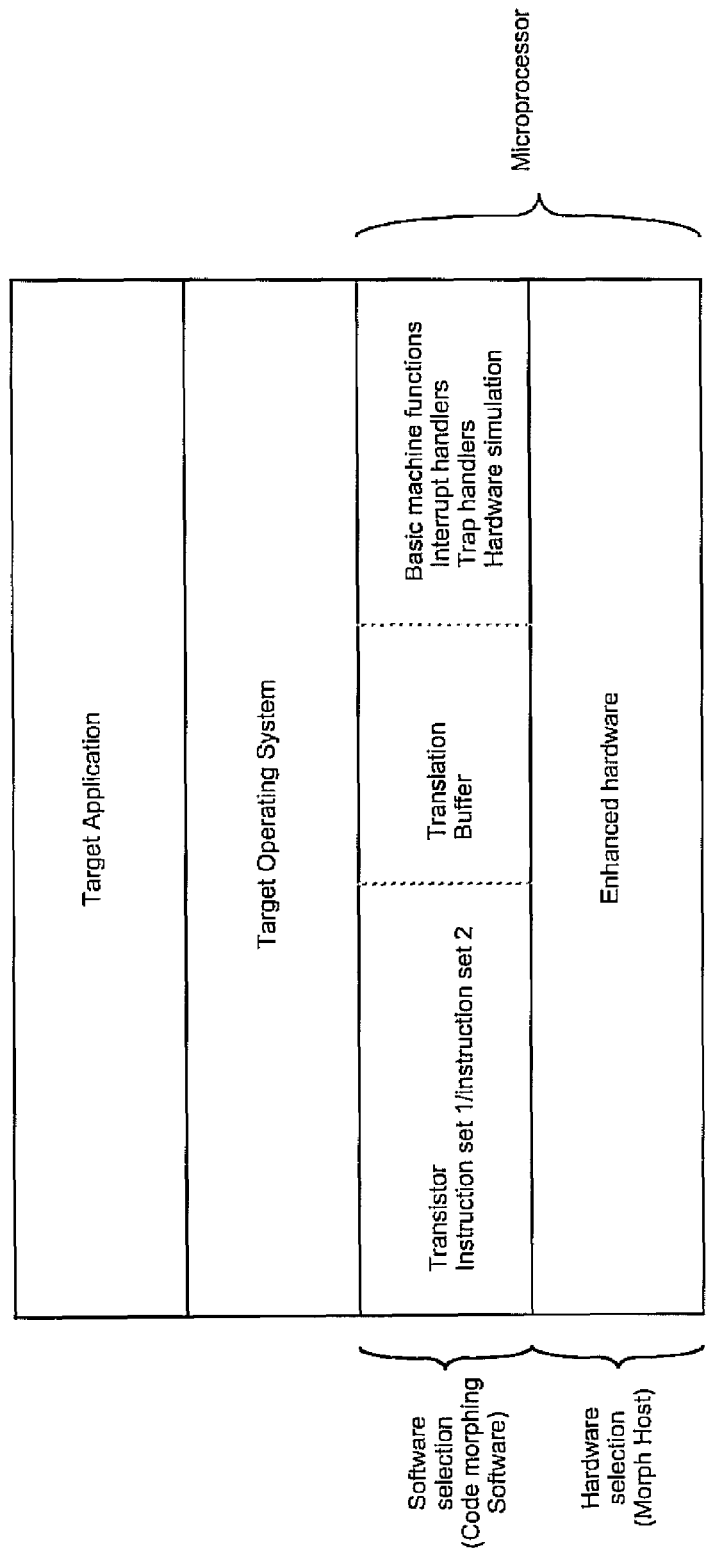
FIG. 2 is a block diagram of a microprocessor designed in accordance with the present invention running an application designed for a different microprocessor.

FIG. 2 is a diagram of morph host hardware represented running the same application program which is being run on the CISC processor of FIG. 1(a). As may be seen, the microprocessor includes the code morphing software portion and the enhanced hardware morph host portion described above. The target application furnishes the target instructions to the code morphing software for translation into host instructions which the morph host is capable of executing. In the meantime, the target operating system receives calls from the target application program and transfers these to the code morphing software. In a preferred embodiment of the microprocessor, the morph host is a very long instruction word (VLIW) processor which is designed with a plurality of processing channels. The overall operation of such a processor is further illustrated in FIG. 6(c).

Figure 6:
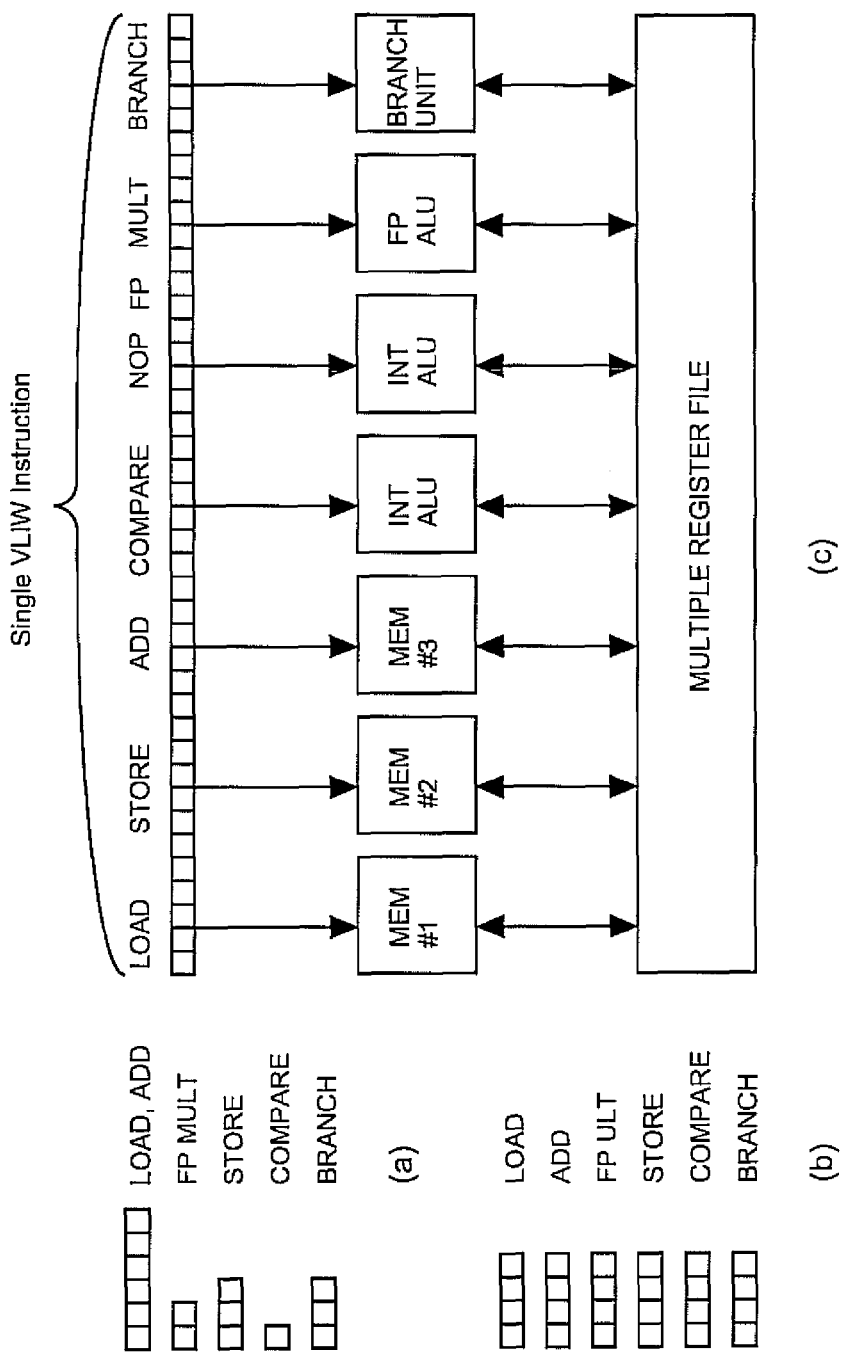
FIG. 6(a)–(c) illustrate instructions used in various microprocessors of the prior art and in a microprocessor designed in accordance with the present invention.

In FIG. 6(a)–(c) are illustrated instructions adapted for use with each of a CISC processor, a RISC processor, and a VLIW processor. As may be seen, the CISC instructions are of varied lengths and may include a plurality of more primitive operations (e.g., load and add). The RISC instructions, on the other hand, are of equal length and are essentially primitive operations. The single very long instruction for the VLIW processor illustrated includes each of the more primitive operations (i.e., load, store, integer add, compare, floating point multiply, and branch) of the CISC and RISC instructions. As may be seen in FIG. 6(c), each of the primitive instructions which together make up a single very long instruction word is furnished in parallel with the other primitive instructions either to one of a plurality of separate processing channels of the VLIW processor or to memory to be dealt with in parallel by the processing channels and memory. The results of all of these parallel operations are transferred into a multiported register file.

A VLIW processor which may be the basis of the morph host is a much simpler processor than the other processors described above. It does not include circuitry to detect issue dependencies or to reorder, optimize, and reschedule primitive instructions. This, in turn, allows faster processing at higher clock rates than is possible with either the processors for which the target application programs were originally designed or other processors using emulation programs to run target application programs. However, the processor is not limited to VLIW processors and may function as well with any type of processor such as a RISC processor.

The code morphing software of the microprocessor shown in FIG. 2 includes a translator portion which decodes the instructions of the target application, converts those target instructions to the primitive host instructions capable of execution by the morph host, optimizes the operations required by the target instructions, reorders and schedules the primitive instructions into VLIW instructions (a translation) for the morph host, and executes the host VLIW instructions. The operations of the translator are illustrated in FIG. 7 which illustrates the operation of the main loop of the code morphing software.

In order to accelerate the operation of the microprocessor which includes the code morphing software and the enhanced morph host hardware, the code morphing software includes a translation buffer as is illustrated in FIG. 2. The translation buffer of one embodiment is a software data structure which may be stored in memory; a hardware cache might also be utilized in a particular embodiment. The translation buffer is used to store the host instructions which embody each completed translation of the target instructions. As may be seen, once the individual target instructions have been translated and the resulting host instructions have been optimized, reordered, and rescheduled, the resulting host translation is stored in the translation buffer. The host instructions which make up the translation are then executed by the morph host. If the host instructions are executed without generating an exception, the translation may thereafter be recalled whenever the operations required by the target instruction or instructions are required.

Figure 7:
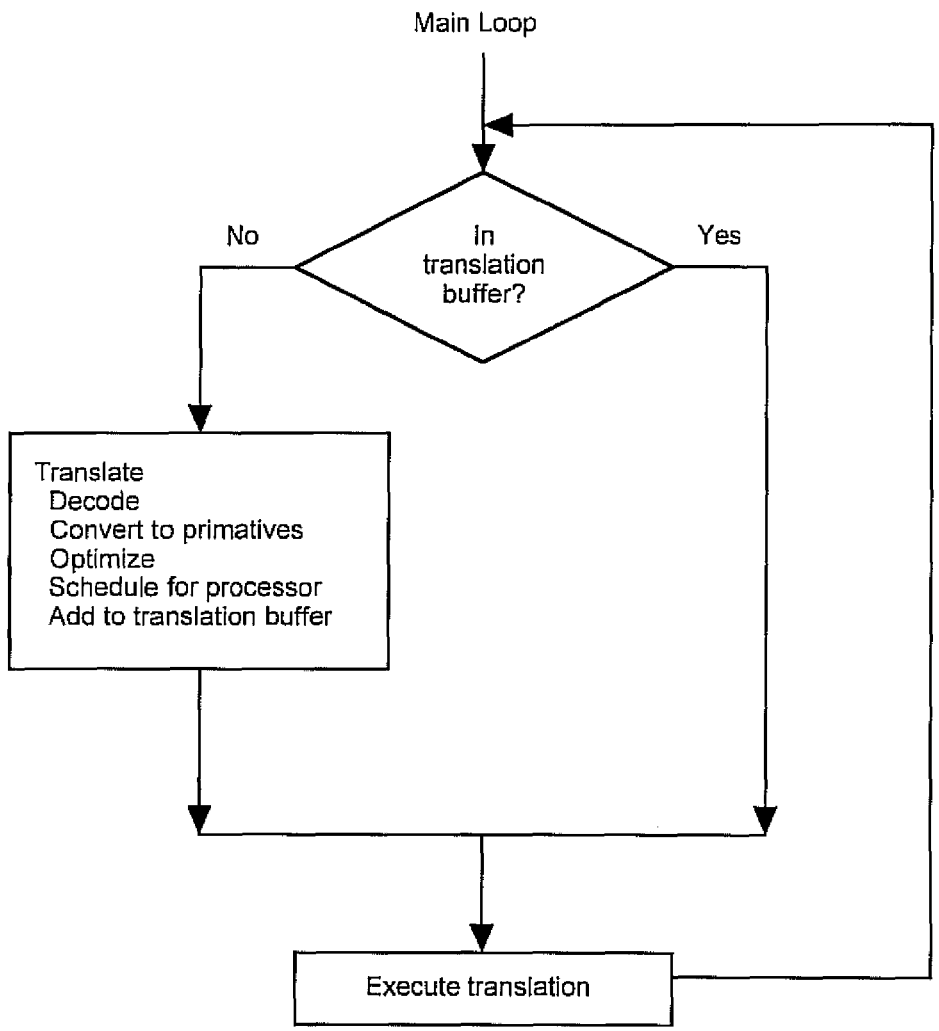
FIG. 7 illustrates a method practiced by a software portion of a microprocessor designed in accordance with the present invention.

Thus, as shown in FIG. 7, a typical operation of the code morphine software of the microprocessor when furnished the address of a target instruction by the application program is to first determine whether the target instruction at the target address has been translated. If the target instruction has not been translated, it and subsequent target instructions are fetched, decoded, translated, and then (possibly) optimized, reordered, and rescheduled into a new host translation, and stored in the translation buffer by the translator. As will be seen later, there are various degrees of optimization which are possible. The term "optimization" is often used generically in this specification to refer to those techniques by which processing is accelerated. For example, reordering is one form of optimization which allows faster processing and which is included within the term. Many of the optimizations which are possible have been described within the prior art of compiler optimizations, and some optimizations which were difficult to perform within the prior art like "super-blocks" come from VLIW research. Control is then transferred to the translation to cause execution by the enhanced morph host hardware to resume.

When the particular target instruction sequence is next encountered in running the application, the host translation will then be found in the translation buffer and immediately executed without the necessity of translating, optimizing, reordering, or rescheduling. Using the advanced techniques described below, it has been estimated that the translation for a target instruction (once completely translated) will be found in the translation buffer all but once for each one million or so executions of the translation. Consequently, after a first translation, all of the steps required for translation such as decoding, fetching primitive instructions, optimizing the primitive instructions, rescheduling into a host translation, and storing in the translation buffer may be eliminated from the processing required. Since the processor for which the target instructions were written must decode, fetch, reorder, and reschedule each instruction each time the instruction is executed, this drastically reduces the work required for executing the target instructions and increases the speed of the microprocessor of the improved processor.

In eliminating all of these steps required in execution of a target application by prior art processors, the microprocessor including the present invention overcomes problems of the prior art which made such operations impossible at any reasonable speed. For example, some of the techniques of the improved microprocessor were used in the emulators described above used for porting applications to other systems. However, some of these emulators had no way of running more than short portions of applications because in processing translated instructions, exceptions which generate calls to various system exception handlers were generated at points in the operation at which the state of the host processor had no relation to the state of a target processor processing the same instructions. Because of this, the state of the target processor at the point at which such an exception was generated was not known. Thus, correct state of the target machine could not be determined; and the operation would have to be stopped, restarted, and the correct state ascertained before the exception could be serviced and execution continued. This made running an application program at host speed impossible.

The morph host hardware includes a number of enhancements which overcome this problem. These enhancements are each illustrated in FIGS. 3, 4, and 5. In order to determine the correct state of the registers at the time an error occurs, a set of official target registers is provided by the enhanced hardware to hold the state of the registers of the target processor for which the original application was designed. These target registers may be included in each of the floating point units, any integer units, and any other execution units. These official registers have been added to the morph host along with an increased number of normal working registers so that a number of optimizations including register renaming may be practiced. One embodiment of the enhanced hardware includes sixty-four working registers in the integer unit and thirty-two working registers in the floating point unit. The embodiment also includes an enhanced set of target registers which include all of the frequently changed registers of the target processor necessary to provide the state of that processor; these include condition control registers and other registers necessary for control of the simulated system.

It should be noted that depending on the type of enhanced processing hardware utilized by the morph host, a translated instruction sequence may include primitive operations which constitute a plurality of target instructions from the original application. For example, a VLIW microprocessor may be capable of running a plurality of either CISC or RISC instructions at once as is illustrated in FIG. 6(a)–(c). Whatever the morph host type, the state of the target registers of the morph host hardware is not changed except at an integral target instruction boundary; and then all target registers are updated. Thus, if the microprocessor is executing a target instruction or instructions which have been translated into a series of primitive instructions which may have been reordered and rescheduled into a host translation, when the processor begins executing the translated instruction sequence, the official target registers hold the values which would be held by the registers of the target processor for which the application was designed when the first target instruction was addressed. After the morph host has begun executing the translated instructions, however, the working registers hold values determined by the primitive operations of the translated instructions executed to that point. Thus, while some of these working registers may hold values which are identical to those in the official target registers, others of the working registers hold values which are meaningless to the target processor. This is especially true in an embodiment which provides many more registers than does a particular target machine in order to allow advanced acceleration techniques. Once the translated host instructions begin, the values in the working registers are whatever those translated host instructions determine the condition of those registers to be. If a set of translated host instructions is executed without generating an exception, then the new working register values determined at the end of the set of instructions are transferred together to the official target registers (possibly including a target instruction pointer register). In the present embodiment of the processor, this transfer occurs outside of the execution of the host instructions in an additional pipeline stage so it does not slow operation of the morph host.

Figure 5:
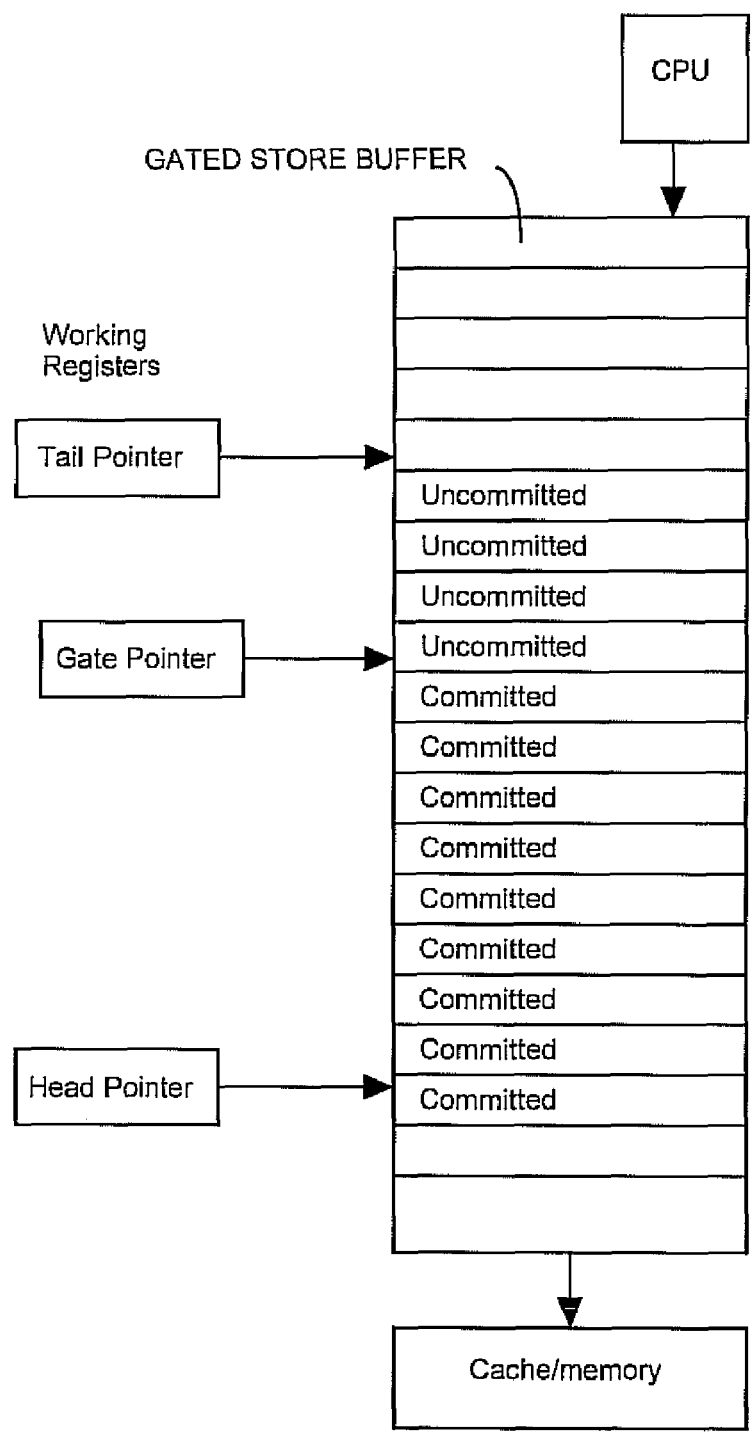
FIG. 5 is a block diagram illustrating a gated store buffer designed in accordance with the present invention.

In a similar manner, a gated store buffer such as that illustrated in FIG. 5 is utilized in the hardware of the improved microprocessor to control the transfer of data to memory. The gated store buffer includes a number of elements each of which may hold the address and data for a memory store operation. These elements may be implemented by any of a number of different hardware arrangements (e.g., first-in first-out buffers); the embodiment illustrated is implemented utilizing random access memory and three dedicated working registers. The three registers store, respectively, a pointer to the head of the queue of memory stores, a pointer to the gate, and a pointer to the tail of the queue of the memory stores. Memory stores positioned between the head of the queue and the gate are already committed to memory, while those positioned between the gate of the queue and the tail are not yet committed to memory. Memory stores generated during execution of host translations are placed in the store buffer by the integer unit in the order generated during the execution of the host instructions by the morph host but are not allowed to be written to memory until a commit operation is encountered in a host instruction. Thus, as translations execute, the store operations are placed in the queue. Assuming these are the first stores so that no other stores are in the gated store buffer, both the head and gate pointers will point to the same position. As each store is executed, it is placed in the next position in the queue and the tail point is incremented to the next position (upward in the figure). This continues until a commit command is executed. This will normally happen when the translation of a set of target instructions has been completed without generating an exception or a error exit condition. When a translation has been executed by the morph host without error, then the memory stores in the store buffer generated during execution are moved together past the gate of the store buffer (committed) and subsequently written to memory. In the embodiment illustrated, this is accomplished by copying the value in the register holding the tail pointer to the register holding the gate pointer.

Thus, it may be seen that both the transfer of register state from working registers to official target registers and the transfer of working memory stores to official memory occur together and only on boundaries between integral target instructions in response to explicit commit operations.

This allows the microprocessor to recover from target exceptions which occur during execution by the enhanced morph host without any significant delay. If a target exception is generated during the running of any translated instruction or instructions, that exception is detected by the morph host hardware or software. In response to the detection of the target exception, the code morphing software may cause the values retained in the official registers to be placed back into the working registers and any non-committed memory stores in the gated store buffer to be dumped (an operation referred to as "rollback"). The memory stores in the gated store buffer of FIG. 5 may be dumped by copying the value in the register holding the gate pointer to the register holding the tail pointer.

Placing the values from the target registers into the working registers may place the address of the first of the target instructions which were running when the exception occurred in the working instruction pointer register. Beginning with this official state of the target processor in the working registers, the target instructions which were running when the exception occurred are retranslated in serial order without any reordering or other optimizing. After each target instruction is newly decoded and translated into a new host translation, the translated host instruction representing the target instructions is executed by the morph host and causes or does not cause an exception to occur. (If the morph host is other than a VLIW processor, then each of the primitive operations of the host translation is executed in sequence. If no exception occurs as the host translation is run, the next primitive function is run.) This continues until an exception re-occurs or the single target instruction has been translated and executed. In one embodiment, if a translation of a target instruction is executed without an exception being generated, then the state of working registers is transferred to the target registers and any data in the gated store buffer is committed so that it may be transferred to memory. However, if an exception re-occurs during the running of a translation, then the state of the target registers and memory has not changed but is identical to the state produced in a target computer when the exception occurs. Consequently, when the target exception is generated, the exception will be correctly handled by the target operating system.

Similarly, once a first target instruction of the series of instructions the translation of which generated an exception has been executed without generating an exception, the target instruction pointer points to the next of the target instructions. This second target instruction is decoded and retranslated without optimizing or reordering in the same manner as the first. As each of the host translations of a single target instruction is processed by the morph host, any exception generated will occur when the state of the target registers and memory is identical to the state which would occur in the target computer. Consequently, the exception may be immediately and correctly handled. These new translations may be stored in the translation buffer as the correct translations for that sequence of instructions in the target application and recalled whenever the instructions are rerun.

Other embodiments for accomplishing the same result as the gated store buffer of FIG. 5 might include arrangements for transferring stores directly to memory while recording data sufficient to recover state of the target computer in case the execution of a translation results in an exception or an error necessitating rollback. In such a case, the effect of any memory stores which occurred during translation and execution would have to be reversed and the memory state existing at the beginning of the translation restored; while working registers would have to receive data held in the official target registers in the manner discussed above. One embodiment for accomplishing this maintains a separate target memory to hold the original memory state which is then utilized to replace overwritten memory if a rollback occurs. Another embodiment for accomplishing memory rollback logs each store and the memory data replaced as they occur, and then reverses the store process if rollback is required.

Figure 8:
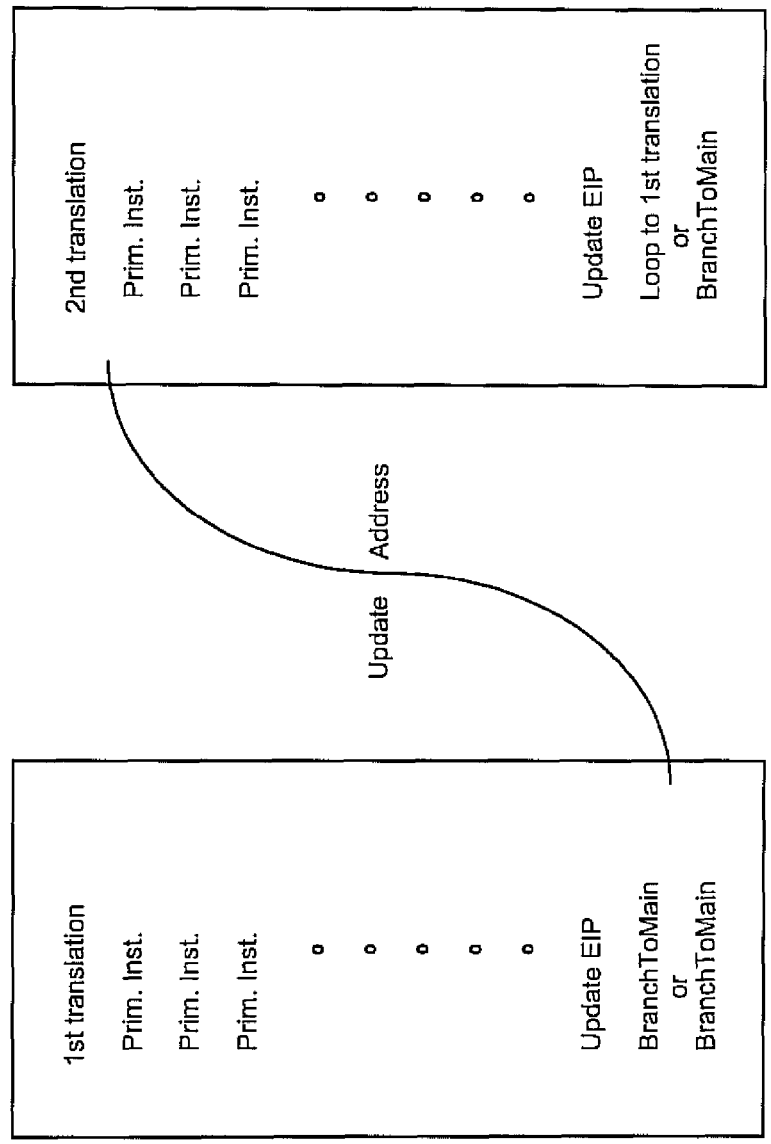
FIG. 8 illustrates another method practiced by a software portion of a microprocessor designed in accordance with the present invention.

The code morphing software provides an additional operation which greatly enhances the speed of processing programs which are being translated. In addition to simply translating the instructions, optimizing, reordering, rescheduling, caching, and executing each translation so that it may be rerun whenever that set of instructions needs to be executed, the translator also links the different translations to eliminate in almost all cases a return to the main loop of the translation process. FIG. 8 illustrates the steps carried out by the translator portion of the code morphing software in accomplishing this linking process. It will be understood by those skilled in the art that this linking operation essentially eliminates the return to the main loop for most translations of instructions, which eliminates this overhead.

Presume for exemplary purposes that the target program being run consists of X86 instructions. When a translation of a sequence of target instructions occurs and the primitive host instructions are reordered and rescheduled, two primitive instructions may occur at the end of each host translation. The first is a primitive instruction which updates the value of the instruction pointer for the target processor (or its equivalent); this instruction is used to place the correct address of the next target instruction in the target instruction pointer register. Following this primitive instruction is a branch instruction which contains the address of each of two possible targets for the branch. The manner in which the primitive instruction which precedes the branch instruction may update the value of the instruction pointer for the target processor is to test the condition code for the branch in the condition code registers and then determine whether one of the two branch addresses indicated by the condition controlling the branch is stored in the translation buffer. The first time the sequence of target instructions is translated, the two branch targets of the host instruction both hold the same host processor address for the main loop of the translator software.

When the host translation is completed, stored in the translation buffer, and executed for the first time, the instruction pointer is updated in the target instruction pointer register (as are the rest of the target registers); and the operation branches back to the main loop. At the main loop, the translator software looks up the instruction pointer to the next target instruction in the target instruction pointer register. Then the next target instruction sequence is addressed. Presuming that this sequence of target instructions has not yet been translated and therefore a translation does not reside in the translation buffer, the next set of target instructions is fetched from memory, decoded, translated, optimized, reordered, rescheduled, cached in the translation buffer, and executed. Since the second set of target instructions follows the first set of target instructions, the primitive branch instruction at the end of the host translation of the first set of target instructions is automatically updated to substitute the address of the host translation of the second set of target instructions as the branch address for the particular condition controlling the branch.

If then, the second translated host instruction were to loop back to the first translated host instruction, the branch operation at the end of the second translation would include the main loop address and the X86 address of the first translation as the two possible targets for the branch. The update-instruction-pointer primitive operation preceding the branch tests the condition and determines that the loop back to the first translation is to be taken and updates the target instruction pointer to the X86 address of the first translation. This causes the translator to look in the translation buffer to see if the X86 address being sought appears there. The address of the first translation is found, and its value in host memory space is substituted for the X86 address in the branch at the end of the second host translated instruction. Then, the second host translated instruction is cached and executed. This causes the loop to be run until the condition causing the branch from the first translation to the second translation fails, and the branch takes the path back to the main loop. When this happens, the first translated host instruction branches back to the main loop where the next set of target instructions designated by the target instruction pointer is searched for in the translation buffer, the host translation is fetched from the cache; or the search in the translation buffer fails, and the target instructions are fetched from memory and translated. When this translated host instruction is cached in the translation buffer, its address replaces the main loop address in the branch instruction which ended the loop.

In this manner, the various translated host instructions are chained to one another so that the need to follow the long path through the translator main loop only occurs where a link does not exist. Eventually, the main loop references in the branch instructions of host instructions are almost completely eliminated. When this condition is reached, the time required to fetch target instructions, decode target instructions, fetch the primitive instructions which make up the target instructions, optimize those primitive operations, reorder the primitive operations, and reschedule those primitive operations before running any host instruction is eliminated. Thus, in contrast to all prior art microprocessors which must take each of these steps each time any application instruction sequence is run, the work required to run any set of target instructions using the improved microprocessor after the first translation has taken place is drastically reduced. This work is further reduced as each set of translated host instructions is linked to the other sets of translated host instructions. In fact, it is estimated that translation will be needed in less than one translation execution out of one million during the running of an application.

Those skilled in the art will recognize that the implementation of the microprocessor requires a large translation buffer since each set of instructions which is translated is cached in order that it need not be translated again. Translators designed to function with applications programmed for different systems will vary in their need for supporting buffer memory. However, one embodiment of the microprocessor designed to run X86 programs utilizes a translation buffer of two megabytes of random access memory.

Two additional hardware enhancements help to increase the speed at which applications can be processed by the microprocessor which includes the present invention. The first of these is an abnormal/normal (A/N) protection bit stored with each address translation in a translation look-aside buffer (TLB) (see FIG. 3) where lookup of the physical address of target instructions is first accomplished. Target memory operations within translations can be of two types, ones which operate on memory (normal) or ones which operate on a memory mapped I/O device (abnormal).

A normal access which affects memory completes normally. When instructions operate on memory, the optimizing and reordering of those instructions is appropriate and greatly aids in speeding the operation of any system using the microprocessor which includes the present invention. On the other hand, the operations of an abnormal access which affects an I/O device often must be practiced in the precise order in which those operations are programmed without the elimination of any steps or they may have some adverse affect at the I/O device. For example, a particular I/O operation may have the effect of clearing an I/O register; if the primitive operations take place out of order, then the result of the operations may be different than the operation commanded by the target instruction. Without a means to distinguish memory from memory mapped I/O, it is necessary to treat all memory with the conservative assumptions used to translate instruction which affect memory mapped I/O. This severely restricts the nature of optimizations that are achievable. Because prior art emulators lacked means to both detect a failure of speculation on the nature of the memory being addressed, and means to recover from such failures, their performance was restricted.

Figure 11:
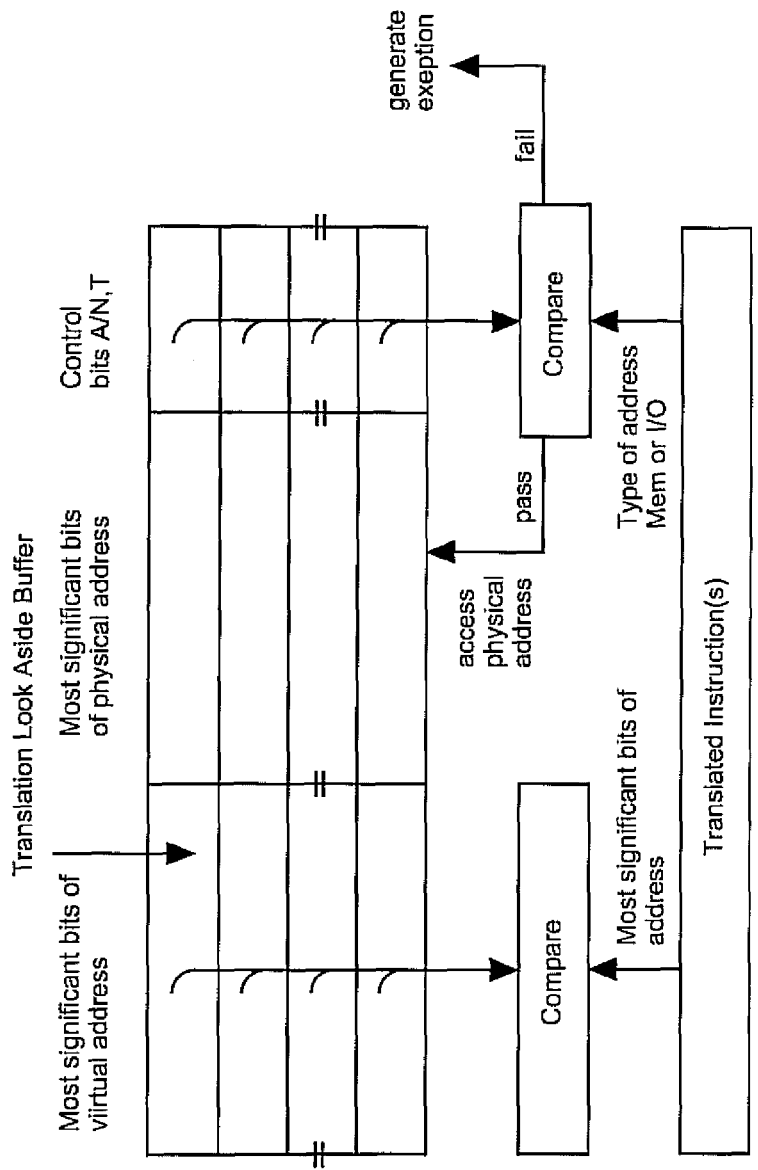
FIG. 11 is a block diagram illustrating in more detail a translation look aside buffer shown in the microprocessor of FIG. 3.

In one embodiment of the microprocessor illustrated in FIG. 11, the A/N bit is a bit which may be set in the translation look-aside buffer to indicate either a memory page or memory-mapped I/O. The translation took-aside buffer stores page table entries for memory accesses. Each such entry includes a virtual address being accessed and the physical address at which the data sought may be accessed as well as other information regarding the entry. In the present invention, the A/N bit is part of that other information and indicates whether the physical address is a memory address or a memory-mapped I/O address. A translation of an operation which affects memory as though it were a memory operation is actually a speculation that the operation is one affecting memory. In one embodiment, when the code morphing software first attempts to execute a translation which requires an access of either memory or a memory-mapped I/O device, it is actually presuming that the access is a memory access. In a different embodiment, the software might presume the target command requires an I/O access. Presuming an access of that address has not previously been accomplished, there will be no entry in the translation look-aside buffer; and the access will fail in the translation look-aside buffer. This failure causes the software to do a page table lookup and fill a storage location of the translation look-aside buffer with the page table entry to provide the correct physical address translation for the virtual address. In accomplishing this, the software causes the A/N bit for the physical address to be entered in the translation look-aside buffer. Then another attempt to execute the access takes place once more assuming that the access is of a memory address. As the access is attempted, the target memory reference is checked by comparing the access type presumed (normal or abnormal) against the A/N protection bit now in the TLB page table entry. When the access type does not match the A/N protection, an exception occurs. If the operation in fact affects memory, then the optimizing, reordering, and rescheduling techniques described above were correctly applied during translation. If the comparison with the A/N bit in the TLB shows that the operation, however, affects an I/O device, then execution causes an exception to be taken; and the translator produces a new translation one target instruction at a time without optimizing, reordering, or rescheduling of any sort. Similarly, if a translation incorrectly assumes an I/O operation for an operation which actually affects memory, execution causes an exception to be taken; and the target instructions are retranslated using the optimizing, reordering, and rescheduling techniques. In this manner, the processor can enhance performance beyond what has been traditionally possible.

It will be recognized by those skilled in the art that the technique which uses the A/N bit to determine whether a failure of speculation has occurred as to whether an access is to memory or a memory-mapped I/o device may also be used for speculations regarding other properties of memory-mapped addresses. For example, different types of memory might be distinguished using such a normal/abnormal bit. Other similar uses is distinguishing memory properties will be found by those skilled in the art.

One of the most frequent speculations practiced by the improved microprocessor is that target exceptions will not occur within a translation. This allows significant optimization over the prior art. First, target state does not have to be updated on each target instruction boundary, but only on target instruction boundaries which occur on translation boundaries. This eliminates instructions necessary to save target state on each target instruction boundary. Optimizations that would previously have been impossible in scheduling and removing redundant operations are also made possible.

The improved microprocessor is admirably adapted to select the appropriate process of translation. In accordance with the method of translating described above, a set of instructions may first be translated as though it were to affect memory. When the optimized, reordered, and rescheduled host instructions are then executed, the address may be found to refer to an I/O device by the condition of the A/N bit provided in the translation look-aside buffer. The comparison of the A/N bit and the translated instruction address which shows that an operation is an I/O operation generates an error exception which causes a software initiated rollback procedure to occur, causing any uncommitted memory stores to be dumped and the values in the target registers to be placed back into the working registers. Then the translation starts over, one target instruction at a time without optimization, reordering, or rescheduling. This re-translation is the appropriate host translation for an I/O device.

In a similar manner, it is possible for a memory operation to be incorrectly translated as an I/O operation. The error generated may be used to cause its correct re-translation where it may be optimized, reordered, and rescheduled to provide faster operation.

Prior art emulators have also struggled with what is generally referred to as self modifying code. Should a target program write to the memory that contains target instructions, this will cause translations that exist for these target instructions to become "stale" and no longer valid. It is necessary to detect these stores as they occur dynamically. In the prior art, such detection has to be accomplished with extra instructions for each store. This problem is larger in scope than programs modifying themselves. Any agent which can write to memory, such as a second processor or a DMA device, can also cause this problem.

The present invention deals with this problem by another enhancement to the morph host. A translation bit (T bit) which may also be stored in the translation look-aside buffer is used to indicate target memory pages for which translations exist. The T bit thus possibly indicates that particular pages of target memory contain target instructions for which host translations exist which would become stale if those target instructions were to be overwritten. If an attempt is made to write to the protected pages in memory, the presence of the translation bit will cause an exception which when handled by the code morphing software can cause the appropriate translation(s) to be invalidated or removed from the translation buffer. The T bit can also be used to mark other target pages that translation may rely upon not being written e.g., target page tables.

Figure 3:
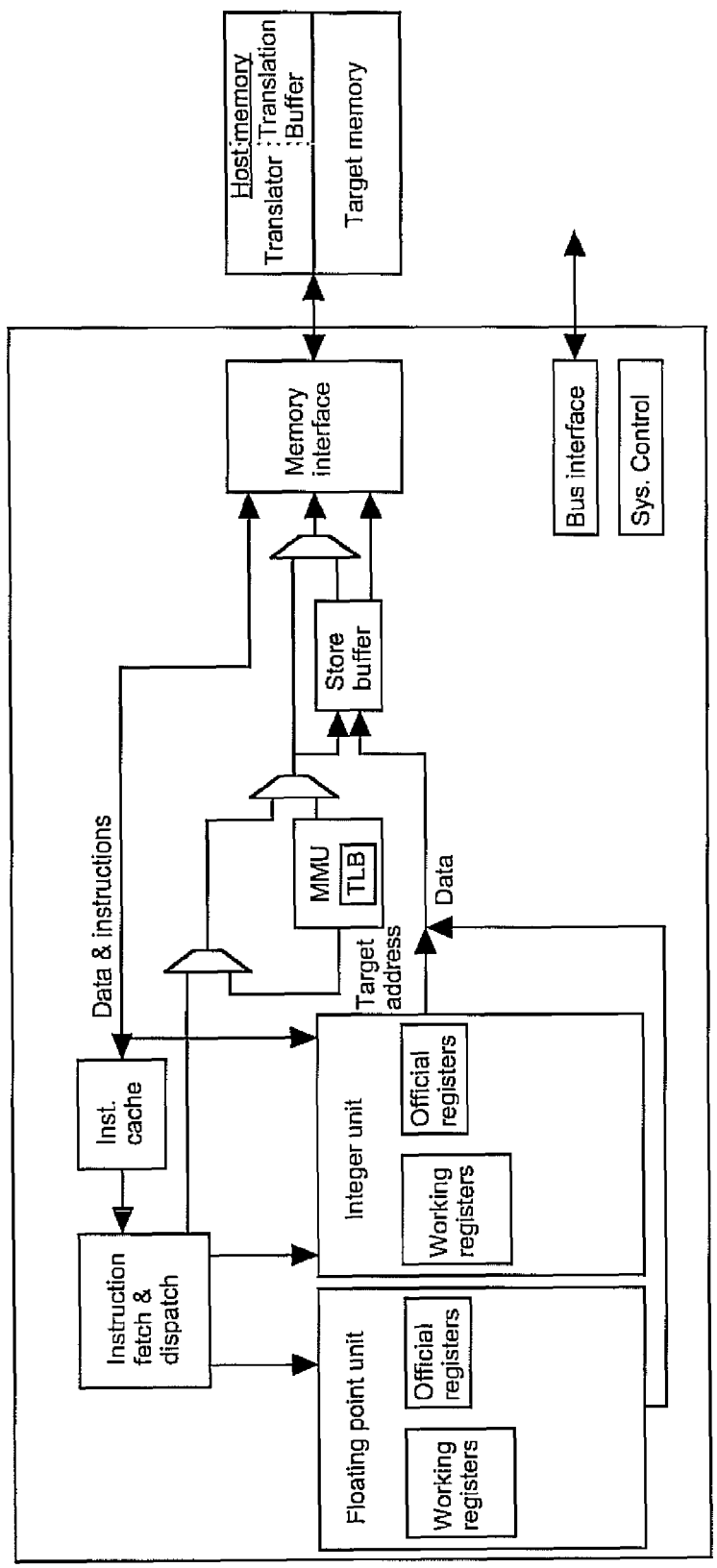
FIG. 3 is a diagram illustrating a portion of the microprocessor shown in FIG. 2.
Figure 4:
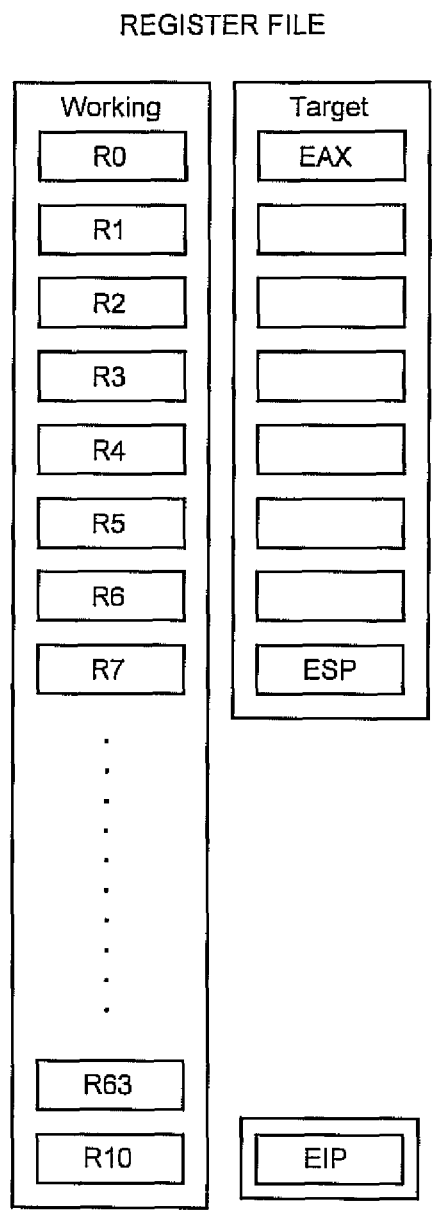
FIG. 4 is a block diagram illustrating a register file used in a microprocessor designed in accordance with the present invention.

This may be understood by referring to FIG. 3 which illustrates in block diagram form the general functional elements of the microprocessor which includes the invention. When the morph host executes a target program, it actually runs the translator portion of the code morphing software which includes the only original untranslated host instructions which effectively run on the morph host. To the right in the figure is illustrated memory divided into a host portion including essentially the translator and the translation buffer and a target portion including the target instructions and data, including the target operating system. The morph host hardware begins executing the translator by fetching host instructions from memory and placing those instructions in an instruction cache. The translator instructions generate a fetch of the first target instructions stored in the target portion of memory. Carrying out a target fetch causes the integer unit to look to the official target instruction pointer register for a first address of a target instruction. The first address is then accessed in the translation look-aside buffer of the memory management unit. The memory management unit includes hardware for paging and provides memory mapping facilities for the TLB. Presuming that the TLB is correctly mapped so that it holds lookup data for the correct page of target memory, the target instruction pointer value is translated to the physical address of the target instruction. At this point, the condition of the bit (T bit) indicating whether a translation has been accomplished for the target instruction is detected; but the access is a read operation, and no T bit exception will occur. The condition of the A/N bit indicating whether the access is to memory or memory mapped I/O is also detected. Presuming the last mentioned bit indicates a memory location, the target instruction is accessed in target memory since no translation exists. The target instruction and subsequent target instructions are transferred as data to the morph host computing units and translated under control of the translator instructions stored in the instruction cache. The translator instructions utilize reordering, optimizing, and rescheduling techniques as though the target instruction affected memory. The resulting translation containing a sequence of host instructions is then stored in the translation buffer in host memory. The translation is transferred directly to the translation buffer in host memory via the gated store buffer. Once the translation has been stored in host memory, the translator branches to the translation which then executes. The execution (and subsequent executions) will determine if the translation has made correct assumptions concerning exceptions and memory. Prior to executing the translation, the T bit for the target page(s) containing the target instructions that have been translated is set. This indication warns that the instruction has been translated; and, if an attempt to write to the target address occurs, the attempt generates an exception which causes the translation to possibly be invalidated or removed.

If a write is attempted to target pages marked by a T bit, an exception occurs and the write is aborted. The write will be allowed to continue after the response to the exception assures that translations associated with the target memory address to be written are either marked as invalid or otherwise protected against use until they have been appropriately updated. Some write operations will actually require nothing to be done since no translations will be affected. Other write operations will require that one or more translations associated with the addressed target memory be appropriately marked or removed. FIG. 11 illustrates one embodiment of a translation look-aside buffer including storage positions with each entry for holding a T bit indication.

Figure 10:
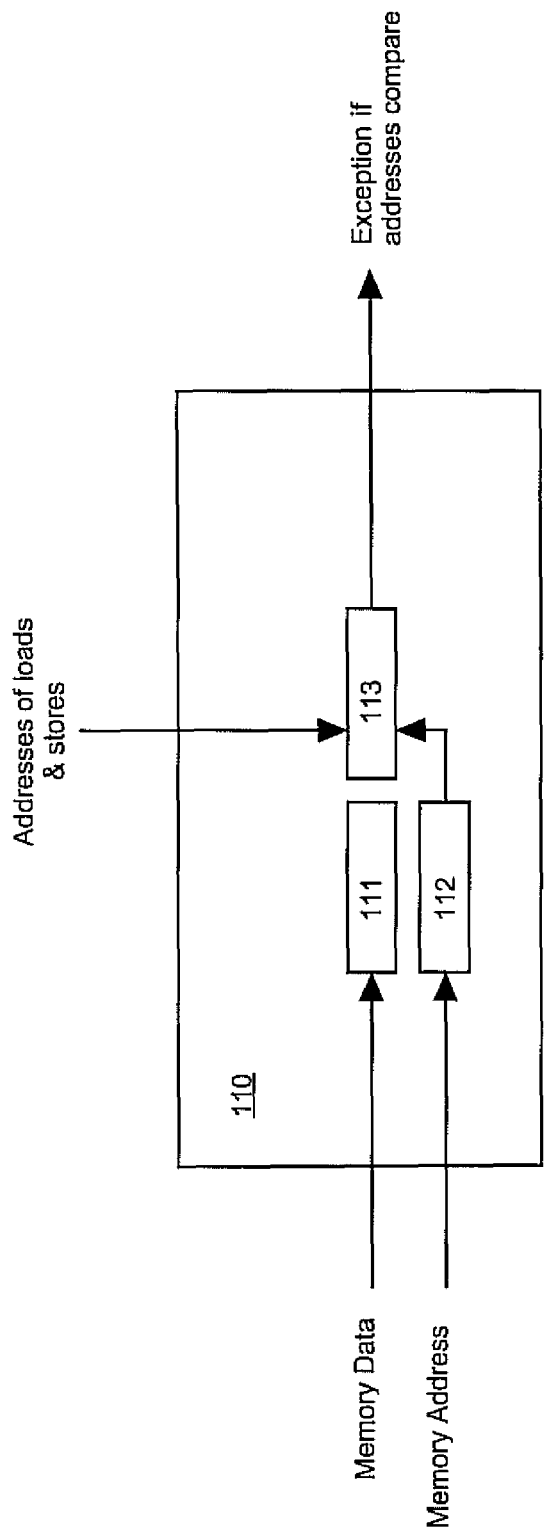
FIG. 10 is a block diagram illustrating a portion of the microprocessor shown in FIG. 3.

An additional hardware enhancement to the morph host is a circuit utilized to allow data which is normally stored in memory but is used quite often in the execution of an operation to be replicated (or "aliased") in an execution unit register in order to eliminate the time required to fetch the data from memory on each use. To accomplish this in one embodiment, the morph host is designed to respond to a "load and protect" command which copies the memory data to a working register 111 in an execution unit 110 shown in FIG. 10 and places the memory address in a register 112 in that unit. Associated with the address register is a comparator 113. The comparator receives the addresses of loads and stores to the gated store buffer directed to memory during translations. If a memory address for either a load or a store compares with an address in the register 112 (or additional registers depending on the implementation), an exception is generated. The code morphing software responds to the exception by assuring that the memory address and the register hold the same correct data. In one embodiment, this is accomplished by rolling back the translation and reexecuting it without any "aliased" data in an execution register. Other possible methods of correcting the problem are to update the register with the latest memory data or memory with the latest load data.

Figure 9:
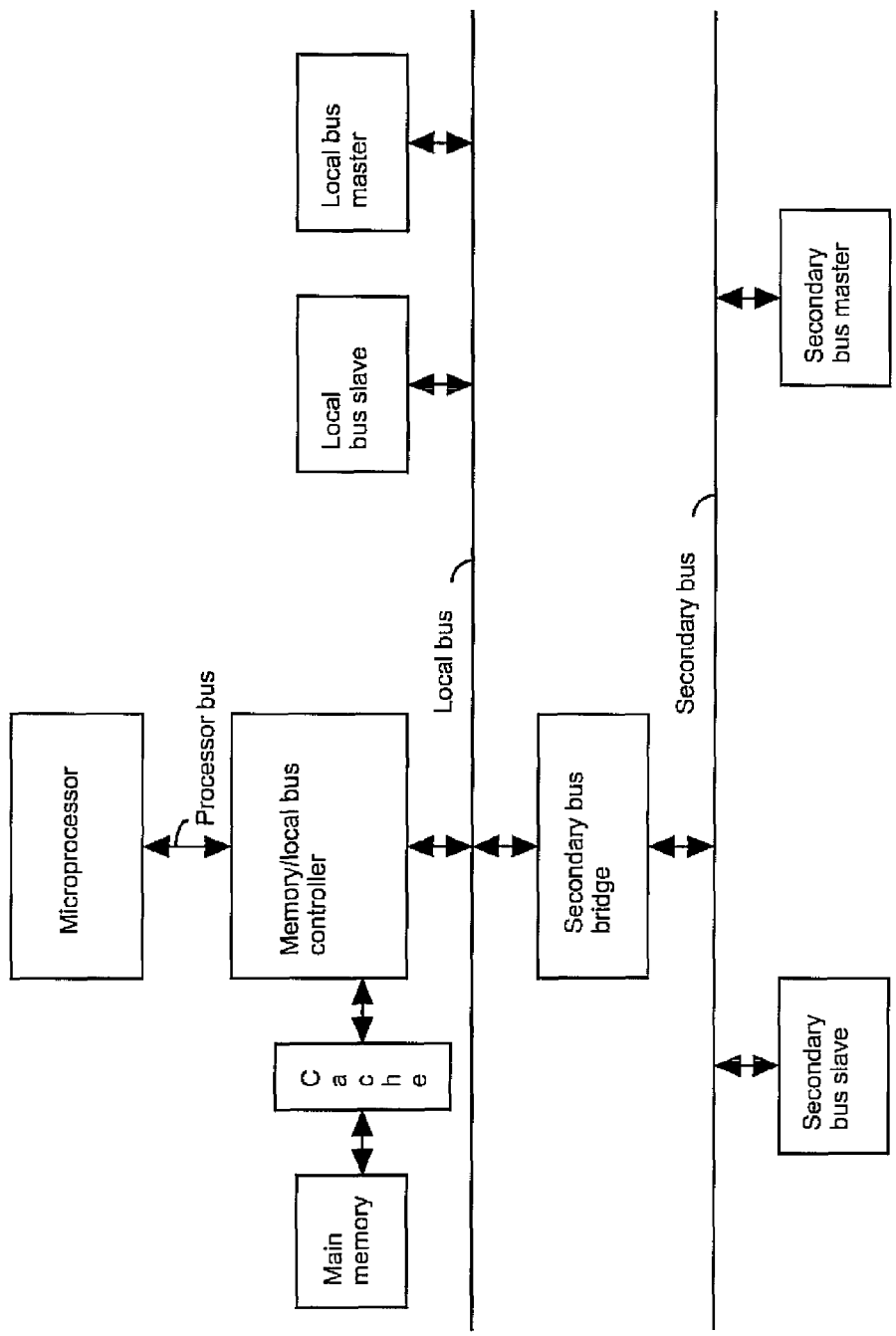
FIG. 9 is a block diagram illustrating an improved computer system including the present invention.

It will be recognized by those skilled in the art that the microprocessor may be connected in circuit with typical computer elements to form a is computer such as that illustrated in FIG. 9. As may be seen, when used in a modern X86 computer the microprocessor is joined by a processor bus to memory and bus control circuitry. The memory and bus control circuitry is arranged to provide access to main memory as well as to cache memory which may be utilized with the microprocessor. The memory and bus control circuitry also provides access to a bus such as a PCI or other local bus through which I/O devices may be accessed. The particular computer system will depend upon the circuitry utilized with a typical microprocessor which the present microprocessor replaces.

In order to illustrate the operation of the processor and the manner in which acceleration of execution occurs, the translation of a small sample of X86 target code to host primitive instructions is presented at this point. The sample illustrates the translation of X86 target instructions to morph host instructions including various exemplary steps of optimizing, reordering, and rescheduling by the microprocessor which includes the invention. By following the process illustrated, the substantial difference between the operations required to execute the original instructions using the target processor and the operations required to execute the translation on the host processor will become apparent to those skilled in the art.

The original instruction illustrated in C language source code describes a very brief loop operation. Essentially, while some variable "n" which is being decremented after each loop remains greater than "0", a value "c" is stored at an address indicated by a pointer "*s" which is being incremented after each loop.

```
Original C code
    while( (n--)>0) {
        *s++=c
    }
```
====================================================
Win32 x86 instructions produced by a compiler compiling this C code.
| | | |
|---|---|---|
| mov | %ecx, [%ebp+0xc] | // load c from memory address into the %ecx |
| mov | %eax, [%ebp+0x8] | // load s from memory address into the %eax |
| mov | [%eax], %ecx | // store c into memory address s held in %eax |
| add | %eax, #4 | // increment s by 4. |
| mov | [%ebp+0x8], %eax | // store (s + 4) back into memory |
| mov | %eax, [%ebp+0x10] | // load n from memory address into the %eax |
| lea | %ecx, [eax−1] | // decrement n and store the result in %ecx |
| mov | [%ebp+0x10], %ecx | // store (n−1) into memory |
| and | %eax, %eax | // test n to set the condition codes |
| jg | .−0x1b | // branch to the top of this section if "n>0" |

====================================================
Notation: [ . . . ] indicates an address expression for a memory operand. In the example above, the address for a memory operand is formed from the contents of a register added to a hexadecimal constant indicated by the 0x prefix. Target registers are indicated with the % prefix, e.g. %ecx is the ecx register. The destination of an operation is to the left.
Target instruction key:
    jg = jump if greater
    mov = move
    lea = load effective address
    and = AND In this first portion of the sample, each of the individual X86 assembly language instructions for carrying out the execution of the operation defined by the C language statement is listed by the assembly language mnemonic for the operation followed by the parameters involved in the particular primitive operation. An explanation of the operation is also provided in a comment for each instruction. Even though the order of execution may be varied by the target processor from that shown, each of these assembly language instructions must be executed each time the loop is executed in carrying out the target C language instructions. Thus, if the loop is executed one hundred times, each instruction shown above must be carried out one hundred times.

Shows each X86 instruction shown above followed by the host instructions necessary to implement the X86 instruction.

| | | |
|---|---|---|
| mov | %ecx, [%ebp+0xc] | // load c from memory address into ecx |
| add | R0, Rebp, 0xc | ; form the memory address and put it in R0 |
| ld | Recx, [R0] | ; load c from memory address in R0 into Recx |
| mov | %eax, [%ebp+0x8] | // load s from memory address into %eax |
| add | R2, Rebp, 0x8 | ; form the memory address and put it in R2 |
| ld | Reax, [R2] | ; load s from memory address in R2 into Recx |
| mov | [%eax], %ecx | // store c into memory address s held in %eax |
| st | [Reax], Recx | ; store c into memory address s held in Reax |
| add | %eax, #4 | // increment s by 4 |
| add | Reax, Reax, 4 | ; increment s by 4 |
| mov | [%ebp+0x8], %eax | // store (s + 4) back into memory |
| add | R5, Rebp, 0x8 | ; form the memory address and put it in R5 |
| st | [R5], Reax | ; store (s + 4) back into memory |
| mov | %eax, [%ebp+0x10] | // load n from memory address into %eax |
| add | R7, Rebp, 0x10 | ; form the memory address and put it in R7 |
| ld | Reax, [R7] | ; load n from memory address into the Reax |
| lea | %ecx, [%eax−1] | // decrement n and store the result in %ecx |
| sub | Recx, Reax, 1 | ; decrement n and store the result in Recx |
| mov | [%ebp+0x10], %ecx | // store (n − 1) into memory |
| add | R9, Rebp, 0x10 | ; form the memory address and put it in R9 |
| st | [R9], Recx | ; store (n − 1) into memory |
| and | %eax, %eax | // test n to set the condition codes |
| andcc | R11, Reax, Reax | ; test n to set the condition codes |
| jg | .−0x1b | // branch to the top of this section if "n>0" |
| jg | mainloop, mainloop | ; jump to the main loop |

Host Instruction key:
    ld = load    add = ADD    st = store
    sub = subtract    jg = jump if condition codes indicate greater
    andcc = and set the condition codes The next sample illustrates the same target primitive instructions which carry out the C language instructions. However, following each primitive target instruction are listed primitive host instructions required to accomplish the same operation in one particular embodiment of the microprocessor in which the morph host is a VLIW processor designed in the manner described herein. It should be noted that the host registers which are shadowed by official target registers are designated by an "R" followed by the X86 register designation so that, for example, Reax is the working register associated with the EAX official target register.

Adds host instructions necessary to perform X86 address computation and upper and lower segment limit checks.

| | | |
|---|---|---|
| mov | %ecx, [%ebp+0xc] | // load c |
| add | R0, Rebp, 0xc | ; form logical address into R0 |
| chkl | R0, Rss_limit | ; Check the logical address against segment lower limit |
| chku | R0, R_FFFFFFFF | ; Check the logical address against segment upper limit |
| add | R1, R0, Rss_base | ; add the segment base to form the linear address |
| ld | Recx, [R1] | ; load c from memory address in R1 into Recx |
| mov | %eax, [%ebp+0x8] | // load s |
| add | R2, Rebp, 0x8 | ; form logical address into R0 |
| chkl | R2, Rss_limit | ; Check the logical address against segment lower limit |

Adds host instructions necessary to perform X86 address computation and upper and lower segment limit checks.

| | | |
|---|---|---|
| chku | R2, R_FFFFFFFF | ; Check the logical address against segment upper limit |
| add | R3, R2, Rss_base | ; add the segment base to form the linear address |
| ld | Reax, [R3] | ; load s from memory address in R3 into Ra |
| mov | [%eax], %ecx | // store c into [s] |
| chku | Reax, Rds_limit | ; Check the logical address against segment upper limit |
| add | R4, Reax, Rds_base | ; add the segment base to form the linear address |
| st | [R4], Recx | ; store c into memory address s |
| add | %eax, #4 | // increment s by 4 |
| addcc | Reax, Reax, 4 | ; increment s by 4 |
| mov | [%ebp+0x8], %eax | // store (s + 4) to memory |
| add | R5, Rebp, 0x8 | ; form logical address into R5 |
| chkl | R5, Rss_limit | ; Check the logical address against segment lower limit |
| chku | R5, R_FFFFFFFF | ; Check the logical address against segment upper limit |
| add | R6, R5, Rss_base | ; add the segment base to form the linear address |
| st | [R6], Reax | ; store (s + 4) to memory address in R6 |
| mov | %eax, [%ebp+0x10] | // load n |
| add | R7, Rebp, 0x10 | ; form logical address into R7 |
| chkl | R7, Rss_limit | ; Check the logical address against segment lower limit |
| chku | R7, R_FFFFFFFF | ; Check the logical address against segment upper limit |
| add | R8, R7, Rss_base | ; add the segment base to form the linear address |
| ld | Reax, [R8] | ; load n from memory address in R8 into Reax |
| lea | %ecx, [%eax−1] | // decrement n |
| sub | Recx, Reax, 1 | ; decrement n |
| mov | [%ebp+0x10], %ecx | // store (n − 1) |
| add | R9, Rebp, 0x10 | ; form logical address into R9 |
| chkl | R9, Rss_limit | ; Check the logical address against segment lower limit |
| chku | R9, R_FFFFFFFF | ; Check the logical address against segment upper limit |
| add | R10, R9, Rss_base | ; add the segment base to form the linear address |
| st | [R10], Recx | ; store n−1 in Recx into memory using address in R10 |
| and | %eax, %eax | // test n to set the condition codes |
| andcc | R11, Reax, Reax | ; test n to set the condition codes |
| jg | .−0x1b | // branch to the top of this section if "n>0" |
| jg | mainloop, mainloop | ; jump to the main loop |

Host Instruction key:
    chkl + check lower limit
    chku = check upper limit

The next sample illustrates for each of the primitive target instructions the addition of host primitive instructions by which addresses needed for the target operation may be generated by the code morphing software. It should be noted that host address generation instructions are only required in an embodiment of a microprocessor in which code morphing software is used for address generation rather than address generation hardware. In a target processor such as an X86 microprocessor these addresses are generated using address generation hardware. Whenever address generation occurs in such an embodiment, the calculation is accomplished; and host primitive instructions are also added to check the address values to determine that the calculated addresses are within the appropriate X86 segment limits.

| Adds instructions to maintain the target X86 instruction pointer "eip" and the commit instructions that use the special morph host hardware to update X86 state. | | |
|---|---|---|
| mov %ecx, [%ebp+0xc] | | // load c |
| add R0,Rebp,0xc | | |
| chkl R0,Rss__limit | | |
| chku R0,R__FFFFFFFF | | |
| add R1,R0,Rss__base | | |
| ld Recx,[R1] | | |
| add Reip,Reip,3 | | ; add X86 instruction length to eip in Reip |
| commit state | | ; commits working state to official |
| mov %eax, [%ebp+0x8] | | // load s |
| add R2,Rebp,0x8 | | |
| chkl R2,Rss__limit | | |
| chku R2,R__FFFFFFFF | | |
| add R3,R2,Rss__base | | |
| ld Reax,[R3] | | |
| add Reip,Reip,3 | | ; add X86 instruction length to eip in Reip |
| commit state | | ; commits working state to official |
| mov [%eax], %ecx | | // store c into [s] |
| chku Reax,Rds__limit | | |
| add R4,Reax,Rds__base | | |
| st [R4],Recx | | |
| add Reip,Reip,2 | | ; add X86 instruction length to eip in Reip |
| commit state | | ; commits working state to official |
| add %eax,#4 | | // increment s by 4 |
| addcc Reax,Reax,4 | | |
| add Reip,Reip,5 | | ; add X86 instruction length to eip in Reip |
| commit state | | ; commits working state to official |
| mov [%ebp+0x8], %eax | | // store (s + 4) |
| add R5,Rebp,0x8 | | |
| chkl R5,Rss__limit | | |
| chku R5,R__FFFFFFFF | | |
| add R6,R5,Rss__base | | |
| st [R6],Reax | | |
| add Reip,Reip,3 | | ; add X86 instruction length to eip in Reip |
| commit state | | ; commits working state to official |
| mov %eax, [%ebp+0x10] | | // load n |
| add R7,Rebp,0x10 | | |
| chkl R7,Rss__limit | | |
| chku R7,R__FFFFFFFF | | |
| add R8,R7,Rss__base | | |
| ld Reax,[R8] | | |
| add Reip,Reip,3 | | ; add X86 instruction length to eip in Reip |
| commit state | | ; commits working state to official |
| lea %ecx, [%eax−1] | | // decrement n |
| sub Recx,Reax,1 | | |
| add Reip,Reip,3 | | ; add X86 instruction length to eip in Reip |
| commit state | | ; commits working state to official |
| mov [%ebp+0x10], %ecx | | // store (n − 1) |
| add R9,Rebp,0x10 | | |
| chkl R9,Rss__limit | | |
| chku R9,R__FFFFFFFF | | |
| add R10,R9,Rss__base | | |
| st [R10],Recx | | |
| add Reip,Reip,3 | | add X86 instruction length to eip in Reip |
| commit state | | ; commits working state to official |
| and %eax, %eax | | // test n |
| andcc R11, Reax, Reax | | |
| add Reip,Reip,3 | | |
| commit state | | ; commits working state to official |

-continued

| Adds instructions to maintain the target X86 instruction pointer "eip" and the commit instructions that use the special morph host hardware to update X86 state. | | |
|---|---|---|
| jg .−0x1b | | // branch "n>0" |
| add Rseq,Reip,Length(jg) | | |
| ldc Rtarg,EIP(target) | | |
| selcc Reip,Rseq,Rtarg | | |
| commit state | | ; commits working state to official |
| jg mainloop,mainloop | | |

Host Instruction key:
commit = copy the contents of the working registers to the official target registers and send working stores to memory This sample illustrates the addition of two steps to each set of primitive host instructions to update the official target registers after the execution of the host instructions necessary to carry out each primitive target instruction and to commit the uncommitted values in the gated store buffer to memory. As may be seen, in each case, the length of the target instruction is added to the value in the working instruction pointer register (Reip). Then a commit instruction is executed. In one embodiment, the commit instruction copies the current value of each working register which is shadowed into its associated official target register and moves a pointer value designating the position of the gate of the gated store buffer from immediately in front of the uncommitted stores to immediately behind those stores so that they will be placed in memory.

It will be appreciated that the list of instructions illustrated last above are all of the instructions necessary to form a host translation of the original target assembly language instructions. If the translation were to stop at this point, the number of primitive host instructions would be much larger than the number of target instructions (probably six times as many instructions), and the execution could take longer than execution on a target processor. However, at this point, no reordering, optimizing, or rescheduling has yet taken place.

If an instruction is to be run but once, it may be that the time required to accomplish further reordering and other optimization is greater than the time to execute the translation as it exists at this point. If so, one embodiment of the microprocessor ceases the translation at this point, stores the translation, then executes it to determine whether exception or errors occur. In this embodiment, steps of reordering and other optimization only occur if it is determined that the particular translation will be run a number times or otherwise should be optimized. This may be accomplished, for example by placing host instructions in each translation which count the number of times a translation is executed and generate an exception (or branch) when a certain value is reached. The exception (or branch) transfers the operation to the code morphing software which then implements some or all of the following optimizations and any additional optimizations determined useful for that translation. A second method of determining translations being run a number of times and requiring optimization is to interrupt the execution of translations at some frequency or on some statistical basis and optimize any translation running at that time. This would ultimately provide that the instructions most often run would be optimized. Another solution would be to optimize each of certain particular types of host instructions such as those which create loops or are otherwise likely to be run most often.

Optimization
Assumes 32 bit flat address space which allows the elimination of segment base additions and some limit checks.

```
            Win32 uses Flat 32b segmentation
            Record Assumptions:
                Rss_base==0
                Rss_limit==0
                Rds_base==0
                Rds_limit==FFFFFFFF
                SS and DS protection check
    mov  %ecx,[%ebp+0xc]        // load c
    add  R0,Rebp,0xc
    chku R0,R_FFFFFFFF
    ld   Recx,[R0]
    add  Reip,Reip,3
    commit
    mov  %eax,[%ebp+0x8]        // load s
    add  R2,Rebp,0x8
    chku R2,R_FFFFFFFF
    ld   Reax,[R2]
    add  Reip,Reip,3
    commit
    mov  [%eax],%ecx            // store c into [s]
    chku Reax,R_FFFFFFFF
    st   [Reax],Recx
    add  Reip,Reip,2
    commit
    add  %eax,#4                // increment s by 4
    addcc Reax,Reax,4
    add  Reip,Reip,5
    commit
    mov  [%ebp+0x8],%eax        // store (s + 4)
    add  R5,Rebp,0x8
    chku R5,R_FFFFFFFF
    st   [R5],Reax
    add  Reip,Reip,3
    commit
    mov  %eax,[%ebp+0x10]       // load n
    add  R7,Rebp,0x10
    chku R7,R_FFFFFFFF
    ld   Reax,[R7]
    add  Reip,Reip,3
    commit
    lea  %ecx,[%eax−1]          // decrement n
    sub  Recx,Reax,1
    add  Reip,Reip,3
    commit
    mov  [%ebp+0x10],%ecx       // store (n − 1)
    add  R9,Rebp,0x10
    chku R9,R_FFFFFFFF
    st   [R9],Recx
    add  Reip,Reip,3
    commit
    and  %eax,%eax              // test n
    andcc R11,Reax,Reax
    add  Reip,Reip,3
    commit
    jg   .−0x1b                 // branch "n>0"
    add  Rseq,Reip,Length(jg)
    ldc  Rtarg,EIP(target)
    selcc Reip,Rseq,Rtarg
    commit
    jg   mainloop,mainloop
```

This sample illustrates a first stage of optimization which may be practiced utilizing the improved microprocessor. This stage of optimization, like many of the other operations of the code morphing software, assumes an optimistic result. The particular optimization assumes that a target application program which has begun as a 32 bit program written for a flat memory model provided by the X86 family of processors will continue as such a program. It will be noted that such an assumption is particular to the X86 family and would not necessarily be assumed with other families of processors being emulated.

If this assumption is made, then in X86 applications all segments are mapped to the same address space. This allows those primitive host instructions required by the X86 segmentation process to be eliminated. As may be seen, the segment values are first set to zero. Then) the base for data is set to zero, and the limit set to the maximum available memory. Then, in each set of primitive host instructions for executing a target primitive instruction, the check for a segment base value and the computation of the segment base address required by segmentation are both eliminated. This reduces the loop to be executed by two host primitive instructions for each target primitive instruction requiring an addressing function. At this point, the host instruction check for the upper memory limit still exists.

It should be noted that this optimization requires the speculation noted that the application utilizes a 32 bit flat memory model. If this is not true, then the error will be discovered as the main loop resolves the destination of control transfers and detects that the source assumptions do not match the destination assumptions. A new translation will then be necessary. This technique is very general and can be applied to a variety of segmentation and other "moded" cases where the "mode" changes infrequently, like debug, system management mode, or "real" mode.

Assume data addressed includes no bytes outside of computer memory limits which can only occur on unaligned page crossing memory references at the upper memory limit, and can be handled by special case software or hardware.

```
    mov  %ecx,[%ebp+0xc]        // load c
    add  R0,Rebp,0xc
    ld   Recx,[R0]
    add  Reip,Reip,3
    commit
    mov  %eax,[%ebp+0x8]        // load s
    add  R2,Rebp,0x8
    ld   Reax,[R2]
    add  Reip,Reip,3
    commit
    mov  [%eax], %ecx           // store c into [s]
    st   [Reax],Recx
    add  Reip,Reip,2
    commit
    add  %eax, #4               // increment s by 4
    addcc Reax,Reax,4
    add  Reip,Reip,5
    commit
    mov  [%ebp+0x8], %eax       // store (s + 4)
    add  R5,Rebp,0x8
    st   [R5],Reax
    add  Reip,Reip,3
    commit
    mov  %eax, [%ebp+0x10]      // load n
    add  R7,Rebp,0x10
    ld   Reax,[R7]
    add  Reip,Reip,3
    commit
    lea  %ecx, [%eax−1]         // decrement n
    sub  Recx,Reax,1
    add  Reip,Reip,3
    commit
    mov  [%ebp+0x10], %ecx      // store (n − 1)
    add  R9,Rebp,0x10
    st   [R9],Recx
    add  Reip,Reip,3
```

-continued

Assume data addressed includes no bytes outside of computer memory limits which can only occur on unaligned page crossing memory references at the upper memory limit, and can be handled by special case software or hardware.

```
commit
and %eax, %eax              // test n
andcc  R11,Reax,Reax
add    Reip,Reip,3
commit
jg .-0x1b                   // branch "n>0"
add    Rseq,Reip,Length(jg)
ldc    Rtarg,EIP(target)
selcc  Reip,Rseq,Rtarg
commit
jg     mainloop,mainloop
```

Host Instruction key:
selcc = Select one of the source registers and copy its contents to the destination register based on the condition codes.

The above sample illustrates a next stage of optimization in which a speculative translation eliminates the upper memory boundary check which is only necessary for unaligned page crossing memory references at the top of the memory address space. Failure of this assumption is detected by either hardware or software alignment fix up. This reduces the translation by another host primitive instruction for each target primitive instruction requiring addressing. This optimization requires both the assumption noted before that the application utilizes a 32 bit flat memory model and the speculation that the instruction is aligned. If these are not both true, then the translation will fail when it is executed; and a new translation will be necessary.

Detect and eliminate redundant address calculations. The example shows the code after eliminating the redundant operations.

```
mov %ecx, [%ebp+0xc]        // load c
add    R0,Rebp,0xc
ld     Recx,[R0]
add    Reip,Reip,3
commit
may %eax, [%ebp+0x8]        // load s
add    R2,Rebp,0x8
ld     Reax,[R2]
add    Reip,Reip,3
commit
mov [%eax], %ecx            // store c into [s]
st     [Reax],Recx
add    Reip,Reip,2
commit
add %eax, #4                // increment s by 4
addcc  Reax,Reax,4
add    Reip,Reip,5
commit
mov [%ebp+0x8], %eax        // store (s + 4)
st     [R2],Reax
add    Reip,Reip,3
commit
mov %eax, [%ebp+0x10]       // load n
add    R7,Rebp,0x10
ld     Reax,[R7]
add    Reip,Reip,3
commit
lea %ecx, [%eax-1]          // decrement n
sub    Recx,Reax,1
add    Reip,Reip,3
commit
mov [%ebp+0x10], %ecx       // store (n - 1)
st     [R7],Recx
add    Reip,Reip,3
commit
```

-continued

Detect and eliminate redundant address calculations. The example shows the code after eliminating the redundant operations.

```
and %eax,%eax               // test n
andcc  R11,Reax,Reax
add    Reip,Reip,3
commit
jg .-0x1b                   // branch "n>0"
add    Rseq,Reip,Length(jg)
ldc    Rtarg,EIP(target)
selcc  Reip,Rseq,Rtarg
commit
jg     mainloop, mainloop
```

This sample illustrates a next optimization in which common host expressions are eliminated. More particularly, in translating the second target primitive instruction, a value in working register Rebp (the working register representing the stack base point register of an X86 processor) is added to an offset value 0x8 and placed in a host working register R2. It will be noted that the same operation took place in translating target primitive instruction five in the previous sample except that the result of the addition was placed in working register R5. Consequently the value to be placed in working register R5 already exists in working register R2 when host primitive instruction five is about to occur. Thus, the host addition instruction may be eliminated from the translation of target primitive instruction five; and the value in working register R2 copied to working register R5. Similarly, a host instruction adding a value in working register Rebp to an offset value 0x10 may be eliminated in the translation of target primitive instruction eight because the step has already been accomplished in the translation of target primitive instruction six and the result resides in register R7. It should be noted that this optimization does not depend on speculation and consequently is not subject to failure and retranslation.

Assume that target exceptions will not occur within the translation so delay updating eip and target state.

```
mov %ecx,[%ebp+0xc]         // load c
add    R0,Rebp,0xc
ld     Recx,[R0]
mov %eax,[%ebp+0x8]         // load s
add    R2,Rebp,0x8
ld     Reax,[R2]
mov [%eax],%ecx             // store c into [s]
st     [Reax],Recx
add %eax,#4                 // increment s by 4
add    Reax,Reax,4
mov [%ebp+0x8],%eax         // store (s + 4)
st     [R2],Reax
mov %eax,[%ebp+0x10]        // load n
add    R7,Rebp,0x10
ld     Reax,[R7]
lea %ecx,[%eax-1]           // decrement n
sub    Recx,Reax,1
mov [%ebp+0x10],%ecx        // store (n - 1)
st     [R7],Recx
and %eax,%eax               // test n
andcc  R11,Reax,Reax
jg .-0x1b                   // branch "n>0"
add    Rseq,Reip,Length(block)
ldc    Rtarg,EIP(target)
selcc  Reip,Rseq,Rtarg
commit
jg     mainloop,mainloop
```

The above sample illustrates an optimization which speculates that the translation of the primitive target instructions making up the entire translation may be accomplished without generating an exception. If this is true, then there is no need to update the official target registers or to commit the uncommitted stores in the store buffer at the end of each sequence of host primitive instructions which carries out an individual target primitive instruction. If the speculation holds true, the official target registers need only be updated and the stores need only be committed once, at the end of the sequence of target primitive instructions. This allows the elimination of two primitive host instructions for carrying out each primitive target instruction. These are replaced by a single host primitive instruction which updates the official target registers and commits the uncommitted stores to memory.

As will be understood, this is another speculative operation which is also highly likely to involve a correct speculation. This step offers a very great advantage over all prior art emulation techniques if the speculation holds true. It allows all of the primitive host instructions which carry out the entire sequence of target primitive instructions to be grouped in a sequence in which all of the individual host primitives may be optimized together. This has the advantage of allowing a great number of operations to be run in parallel on a morph host which takes advantage of the very long instruction word techniques. It also allows a greater number of other optimizations to be made because more choices for such optimizations exist. Once again, however, if the speculation proves untrue and an exception is taken when the loop is executed, the official target registers and memory hold the official target state which existed at the beginning of the sequence of target primitive instructions since a commit does not occur until the sequence of host instructions is actually executed. All that is necessary to recover from an exception is to dump the uncommitted stores, rollback the official registers into the working registers, and restart translation of the target primitive instructions at the beginning of the sequence. This re-translation produces a translation of one target instruction at a time, and the official state is updated after the host sequence representing each target primitive instruction has been translated. This translation is then executed. When the exception occurs on this re-translation, correct target state is immediately available in the official target registers and memory for carrying out the exception.

In summary:

| | |
|---|---|
| add | R0,Rebp,0xc |
| ld | Recx,[R0] |
| add | R2,Rebp,0x8 |
| ld | Reax,[R2] |
| st | [Reax],Recx |
| add | Reax,Reax,4 |
| st | [R2],Reax |
| add | R7,Rebp,0x10 |
| ld | Reax,[R7]          // Live out |
| sub | Recx,Reax,1       // Live out |
| st | [R7],Recx |
| andcc | R11,Reax,Reax |
| add | Rseq,Reip,Length(block) |
| ldc | Rtarg,EIP(target) |
| selcc | Reip,Rseq,Rtarg |
| commit | |
| jg | mainloop,mainloop |

The comment "Live Out" refers to the need to actually maintain Reax and Recx correctly prior to the commit. Otherwise further optimization might be possible.

The summary above illustrates the sequence of host primitive instructions which remain at this point in the optimization process. While this example shows the maintenance of the target instruction pointer (EIP) inline, it is possible to maintain the pointer EIP for branches out of line at translation time, which would remove the pointer EIP updating sequence from this and subsequent steps of the example.

Renaming to reduce register resource dependencies. This will allow subsequent scheduling to be more effective. From this point on, the original target X86 code is omitted as the relationship between individual target X86 instructions and host instructions becomes increasingly blurred.

| | | |
|---|---|---|
| add | R0, Rebp, 0xc | |
| ld | R1, [R0] | |
| add | R2, Rebp, 0x8 | |
| ld | R3, [R2] | |
| st | [R3], R1 | |
| add | R4, R3, 4 | |
| st | [R2], R4 | |
| add | R7, Rebp, 0x10 | |
| ld | Reax, [R7] | // Live out |
| sub | Recx, Reax, 1 | // Live out |
| st | [R7], Recx | |
| andcc | R11, Reax, Reax | |
| add | Rseq, Reip, Length(block) | |
| ldc | Rtarg, EIP(target) | |
| selcc | Reip, Rseq, Rtarg | |
| commit | | |
| jg | mainloop, mainloop | |

This sample illustrates a next step of optimization, normally called register renaming, in which operations requiring working registers used for more than one operation in the sequence of host primitive instructions are changed to utilize a different unused working register to eliminate the possibility that two host instructions will require the same hardware. Thus, for example, the second host primitive instruction in two samples above uses working register Recx which represents an official target register ECX. The tenth host primitive instruction also uses the working register Recx. By changing the operation in the second host primitive instruction so that the value pointed to by the address in R0 is stored in the working register R1 rather than the register Recx, the two host instructions do not both use the same register. Similarly, the fourth, fifth, and sixth host primitive instructions all utilize the working register Reax in the earlier sample; by changing the fourth host primitive instruction to utilize the previously unused working register R3 instead the working register Reax and the sixth host primitive instruction to utilize the previously unused working register R4 instead of the register Reax, these hardware dependencies are eliminated.

After the scheduling process which organizes the primitive host operations as multiple operations that can execute in the parallel on the host VLIW hardware. Each line shows the parallel operations that the VLIW machine executes, and the "&" indicates the parallelism.

| | | |
|---|---|---|
| add | R2,Rebp,0x8 | & add R0,Rebp,0xc |
| nop | | & add R7,Rebp,0x10 |
| ld | R3, [R2] | & add Rseq,Reip,Length(block) |
| ld | R1, [R0] | & add R4,R3,4 |
| st | [R3],R1 | & ldc Rtarg,EIP(target) |
| ld | Reax, [R7] | & nop |
| st | [R2],R4 | & sub Recx,Reax,1 |
| st | [R7],Recx | & andcc R11,Reax,Reax |
| selcc | Reip,Rseq,Rtarg | & jg mainloop,mainloop & commit |

Host Instruction key:
nop = no operation

The above sample illustrates the scheduling of host primitive instructions for execution on the morph host. In this example, the morph host is presumed to be a VLIW processor which in addition to the hardware enhancements provided for cooperating with the code morphing software also includes, among other processing units, two arithmetic and logic (ALU) units. The first line illustrates two individual add instructions which have been scheduled to run together on the morph host. As may be seen, these are the third and the eight primitive host instructions in the sample just before the summary above. The second line includes a NOP instruction (no operation but go to next instruction) and another add instruction. The NOP instruction illustrates that there are not always two instructions which can be run together even after some scheduling optimizing has taken place. In any case, this sample illustrates that only nine sets of primitive host instructions are left at this point to execute the original ten target instructions.

---

Resolve host branch targets and chain stored translations

| add | R2, Rebp, 0x8 | & add | R0, Rebp, 0xc |
|---|---|---|---|
| nop | | & add | R7, Rebp, 0x10 |
| ld | R3, [R2] | & add | Rseq, Reip, Length (block) |
| ld | R1, [R0] | & add | R4, R3, 4 |
| st | [R3], R1 | & ldc | Rtarg, EIP (target) |
| ld | Reax, [R7] | & nop | |
| st | [R2], R4 | & sub | Recx, Reax, 1 |
| st | [R7], Recx | & andcc | R11, Reax, Reax |
| selcc | Reip, Rseq, Rtarg | & jg | Sequential, Target & commit |

---

This sample illustrates essentially the same set of host primitive instructions except that the instructions have by now been stored in the translation buffer and executed one or more times because the last jump (jg) instruction now points to a jump address furnished by chaining to another sequence of translated instructions. The chaining process takes the sequence of instructions out of the translator main loop so that translation of the sequence has been completed.

---

Advanced Optimizations, Backward Code Motion: This and subsequent examples start with the code prior to scheduling. This optimization first depends on detecting that the code is a loop. Then invariant operations can be moved out of the loop body and executed once before entering the loop body.

| entry: | add | R0, Rebp, 0xc |
|---|---|---|
| | add | R2, Rebp, 0x8 |
| | add | R7, Rebp, 0x10 |
| | add | Rseq, Reip, Length (block) |
| | ldc | Rtarg, EIP (target) |
| Loop: | ld | R1, [R0] |
| | ld | R3, [R2] |
| | st | [R3], R1 |
| | add | R4, R3, 4 |
| | st | [R2], R4 |
| | ld | Reax, [R7] |
| | sub | Recx, Reax, 1 |
| | st | [R7], Recx |
| | andcc | R11, Reax, Reax |
| | selcc | Reip, Rseq, Rtarg |
| | commit | |
| | jg | mainloop, Loop |

---

The above sample illustrates an advanced optimization step which is usually only utilized with sequences which are to be repeated a large number of times. The process first detects translations that form loops, and reviews the individual primitives host instructions to determine which instructions produce constant results within the loop body. These instructions are removed from the loop and executed only once to place a value in a register; from that point on, the value stored in the register is used rather than rerunning the instruction.

---

Schedule the loop body after backward code motion. For example purposes, only the code in the loop body is shown scheduled Entry:
| | add | R0,Rebp,0xc | |
|---|---|---|---|
| | add | R2,Rebp,0x8 | |
| | add | R7,Rebp,0x10 | |
| | add | Rseq,Reip,Length(block) | |
| | ldc | Rtarg,EIP(target) | |

Loop:
| | ld | R3,[R2] | & nop |
|---|---|---|---|
| | ld | R1,[R0] | & add R4,R3,4 |
| | st | [R3],R1 | & nop |
| | ld | Reax,[R7] | & nop |
| | st | [R2],R4 | & sub Recx,Reax,1 |
| | st | [R7],Recx | & andcc R11,Reax,Reax |
| | selcc | Reip,Rseq,Rtarg | & jg Sequential,Loop & commit |

Host Instruction key: ldc = load a 32-bit constant

---

When these non-repetitive instructions are removed from the loop and the sequence is scheduled for execution, the scheduled instructions appear as in the last sample above. It can be seen that the initial instructions are performed but once during the first iteration of the loop and thereafter only the host primitive instructions remaining in the seven clock intervals shown are executed during the loop. Thus, the execution time has been reduced to seven instruction intervals from the ten instructions necessary to execute the primitive target instructions.

As may be seen, the steps which have been removed from the loop are address generation steps. Thus, address generation only need be done once per loop invocation in the improved microprocessor; that is, the address generation need only be done one time. On the other hand, the address generation hardware of the X86 target processor must generate these addresses each time the loop is executed. If a loop is executed one hundred times, the improved microprocessor generates the addresses only once while a target processor would generate each address one hundred times.

---

After Backward Code Motion:

Target:
| | add | R0,Rebp,0xc | |
|---|---|---|---|
| | add | R2,Rebp,0x8 | |
| | add | R7,Rebp,0x10 | |
| | add | Rseq,Reip,Length(block) | |
| | ldc | Rtarg,EIP(target) | |

Loop:
| | ld | R1,[R0] | |
|---|---|---|---|
| | ld | R3,[R2] | |
| | st | [R3],R1 | |
| | add | R4,R3,4 | |
| | st | [R2],R4 | |
| | ld | Reax,[R7] | //Live out |
| | sub | Recx,Reax,1 | //Live out |
| | st | [R7],Recx | |
| | andcc | R11,Reax,Reax | |
| | selcc | Reip,Rseq,Rtarg | |
| | commit | | |
| | jg | mainloop,Loop | |

Register Allocation:

This shows the use of register alias detection hardware of the morph host that allows variables to be safely moved from memory into registers. The starting point is the code after "backward code motion". This shows the optimization that can eliminate loads.

-continued

First the loads are performed. The address is protected by the alias hardware, such that should a store to the address occur, an "alias" exception is raised. The loads in the loop body are then replaced with copies. After the main body of the loop, the alias hardware is freed.

```
Entry:
       add    R0,Rebp,0xc
       add    R2,Rebp,0x8
       add    R7,Rebp,0x10
       add    Rseq,Reip,Length(block)
       ldc    Rtarg,EIP(target)
       ld     Rc,[R0]   ;First do the load of the variable from
memory
       prot   [R0],Alias1 ;Then protect the memory location from
stores
       ld     Rs,[R2]
       prot   [R2],Alias2
       ld     Rn,[R7]
       prot   [R7],Alias3
Loop:
       copy   R1,Rc
       copy   R3,Rs
       st     [R3],R1
       add    R4,Rs,4
       copy   Rs,R4
       st     [R2],Rs,NoAliasCheck
       copy   Reax,Rn              //Live out
       sub    Recx,Reax,1          //Live out
       copy   Rn,Recx
       st     [R7],Rn,noAliasCheck
       andcc  R11,Reax,Reax
       selcc  Reip,Rseq,Rtarg
       commit
       jg     Epilog,Loop
Epilog:
       FA     Alias1      Free the alias detection hardware
       FA     Alias2      Free the alias detection hardware
       FA     Alias3      Free the alias detection hardware
       j      Sequential
```

Host Instruction key:
protect = protect address from loads
FA = free alias
copy = copy
j = jump This sample illustrates an even more advanced optimization which may be practiced by the microprocessor including the present invention. Referring back to the second sample before this sample, it will be noticed that the first three add instructions involved computing addresses on the stack. These addresses do not change during the execution of the sequence of host operations. Consequently, the values stored at these addresses may be retrieved from memory and loaded in registers where they are immediately available for execution. As may be seen, this is done in host primitive instructions six, eight, and ten. In instructions seven, nine and eleven, each of the memory addresses is marked as protected by special host alias hardware and the registers are indicated as aliases for those memory addresses so that any attempt to vary the data will cause an exception. At this point, each of the load operations involving moving data from these stack memory addresses becomes a simple register-to-register copy operation which proceeds muck faster than loading from a memory address. It should be noted that once the loop has been executed until n=0, the protection must be removed from each of the memory addresses so that the alias registers may be otherwise utilized.

Copy Propagation:
After using the alias hardware to turn loads within the loop body into copies, copy propagation allows the elimination of some copies.

```
Entry:
       add    R0,Rebp,0xc
       add    R2,Rebp,0x8
       add    R7,Rebp,0x10
       add    Rseq,Reip,Length(block)
       ldc    Rtarg,EIP(target)
       ld     Rc,[R0]
       prot   [R0],Alias1
       ld     Rs,[R2]
       prot   [R2],Alias2
       ld     Recx,[R7]
       prot   [R7],Alias3
Loop:
       st     [Rs],Rc
       add    Rs,Rs,4
       st     [R2],Rs,NoAliasCheck
       copy   Reax,Recx            //Live out
       sub    Recx,Reax,1          //Live out
       st     [R7],Recx,NoAliasCheck
       andcc  R11,Reax,Reax
       selcc  Reip,Rseq,Rtarg
       commit
       jg     Epilog,Loop
Epilog:
       FA     Alias1
       FA     Alias2
       FA     Alias3
       j      Sequential
```

This sample illustrates the next stage of optimization in which it is recognized that most of the copy instructions which replaced the load instructions in the optimization illustrated in the last sample are unnecessary and may be eliminated. That is, if a register-to-register copy operation takes place, then the data existed before the operation in the register from which the data was copied. If so, the data can be accessed in the first register rather than the register to which it is being copied and the copy operation eliminated. As may be seen, this eliminates the first, second, fifth, and ninth primitive host instructions shown in the loop of the last sample. In addition, the registers used in others of the host primitive instructions are also changed to reflect the correct registers for the data. Thus, for example, when the first and second copy instructions are eliminated, the third store instruction must copy the data from the working register Rc where it exists (rather than register R1) and place the data at the address indicated in working register Rs where the address exists (rather than register R3).

Example illustrating scheduling of the loop body only.

```
Entry:
       add    R0,Rebp,0xc
       add    R2,Rebp,0x8
       add    R7,Rebp,0x10
       add    Rseq,Reip,Length(block)
       ldc    Rtarg,EIP(target)
       ld     Rc,[R0]
       prot   [R0],Alias1
       ld     Rs,[R2]
       prot   [R2],Alias2
       ld     Recx,[R7]
       prot   [R7],Alias3
Loop:
       st     [Rs],Rc,          & add Rs,Rs,4 & copy Reax,Recx
       st     [R2],Rs,NAC       & sub Recx,Reax,1
```

-continued

Example illustrating scheduling of the loop body only.

```
Entry:
    st      [R7],Recx,NAC       & andcc R11,Reax,Reax
    selcc   Reip,Rseq,Rtarg     & jg Epilog,Loop & commit
Epilog:
    FA      Alias1
    FA      Alias2
    FA      Alias3
    j       Sequential
```

Host Instruction key:
NAC = No Alias Check

The scheduled host instructions are illustrated in the sample above. It will be noted that the sequence is such that fewer clocks are required to execute the loop than to execute the primitive target instruction originally decoded from the source code. Thus, apart from all of the other acceleration accomplished, the total number of combined operations to be run is simply less than the operations necessary to execute the original target code.

Store Elimination by use of the alias hardware.

```
Entry:
    add     R0,Rebp,0xc
    add     R2,Rebp,0x8
    add     R7,Rebp,0x10
    add     Rseq,Reip,Length(block)
    ldc     Rtarg,EIP(target)
    ld      Rc,[R0]
    prot    [R0],Alias1         ;protect the address from loads and stores
    ld      Rs,[R2]
    prot    [R2],Alias2         ;protect the address from loads and stores
    ld      Recx,[R7]
    prot    [R7],Alias3         ;protect the address from loads and stores
Loop:
    st      [Rs],Rc,            & add Rs,Rs,4 & copy Reax,Recx
    sub     Recx,Reax,1         & andcc R11,Reax,Reax
    selcc   Reip,Rseq,Rtarg     & jg Epilog,Loop & commit
Epilog:
    FA      Alias1
    FA      Alias2
    FA      Alias3
    st      [R2],Rs             ;writeback the final value of Rs
    st      [R7],Recx           ;writeback the final value of Recx
    j       Sequential
```

The final optimization shown in this sample is the use of the alias hardware to eliminate stores. This eliminates the stores from within the loop body, and performs them only in the loop epilog. This reduces the number of host instructions within the loop body to three compared to the original ten target instructions.

Although the present invention has been described in terms of a preferred embodiment, it will be appreciated that various modifications and alterations might be made by those skilled in the art without departing from the spirit and scope of the invention. For example, although the invention has been described with relation to the emulation of X86 processors, it should be understood that the invention applies just as well to programs designed for other processor architectures, and programs that execute on virtual machines, such as P code, Postscript, or Java programs. The invention should therefore be measured in terms of the claims which follow.

What is claimed is:

1. A host computer system for executing a target program, comprising:
   a first primitive operation generated from a first target instruction in said target program;
   a second primitive operation generated from a second target instruction in said target program; and
   a translator scheduling said first primitive operation and said second primitive operation into an instruction of said host computer system and providing an indication that said first and second target instructions have been translated into said first and second primitive operations.

2. The host computer system of claim 1, wherein said first target instruction is compliant with an x-86 instruction set.

3. The host computer system of claim 1, wherein said second primitive operation is a speculative operation.

4. A method of executing a target program on a host computer system, said method comprising:
   generating a first primitive operation from a first target instruction in said target program;
   generating a second primitive operation from a second target instruction in said target program;
   scheduling said first primitive operation and said second primitive operation into a host instruction of said host computer system;
   providing an indication that said first and second target instructions have been translated into said first and second primitive operations; and
   executing said host instruction.

5. The method of claim 4, wherein said first primitive operation is a speculative operation.

6. The method of claim 4, wherein said second primitive operation is a speculative operation.

7. A method of mapping host primitive operations generated from two target instructions into a host instruction during target program execution on host, said method comprising:
   translating two target instructions into said host primitive operations;
   scheduling said host primitive operations into said host instruction; and
   indicating that said target instructions have been translated.

8. The method of claim 7, wherein at least one of said host primitive operations is a speculative operation.

9. A method of executing a target program on a host processor where the target and host instruction sets differ, the method comprising:
   translating target instructions into host primitive operations;
   mapping host primitive operations from two target instructions into a host instruction during target program execution on the host processor;
   providing an indication that said target instructions have been translated; and
   executing said host instruction.

10. The method of claim 9, wherein at least one of said host primitive operations is a speculative operation.

11. A method of executing a target program on a host processor where the target and host instruction sets differ, the method comprising:
   translating target instructions into host primitive operations;
   mapping a host primitive operation into a host instruction comprised of a host primitive operation translated from a different target instruction during target program execution on the host processor;
   indicating that said target instructions have been translated; and
   executing said host instruction.

12. The method of claim 11, wherein at least one of said host primitive operations is a speculative operation.

13. A method of executing a target program on a host processor where the target processor and host processor instruction sets differ, the method comprising:
- storing state of said target processor as it exists at the beginning of translating a target instruction;
- translating target instructions into one or more host instructions;
- indicating that said target instructions have been translated;
- storing said host instructions as a host translation in a buffer;
- executing said host translation on said host processor; and
- updating state of said host processor from stored state of said target processor if execution of said host translation generates an exception.

14. The method of claim 13, wherein said host translation is executed multiple times.

15. A method of executing a target program on a host processor, said method comprising:
- storing a target processor state;
- translating a plurality of target instructions into a host translation;
- indicating that said target instructions have been translated;
- storing said host translation in a buffer;
- executing said host translation from said buffer;
- generating an exception; and
- restoring said target processor state.

16. A method of executing a target program comprising a sequence of a first target instruction followed by a second target instruction followed by a sub-sequence comprising at least one target instruction, said method comprising:
- storing a target processor state after processing said first target instruction;
- translating said second target instruction and said sub-sequence into a host translation;
- indicating that said second target instruction has been translated;
- storing said host translation in a buffer;
- executing said host translation from said buffer;
- generating an exception; and
- restoring said target processor state.

17. A method of executing a target program on a host processor, said method comprising:
- translating a plurality of target instructions into a host translation after storing a target processor state;
- storing said host translation in a buffer;
- indicating that said target instructions have been translated;
- executing said host translation from said buffer;
- generating an exception; and
- restoring said target processor state.

* * * * *